US010820223B2

United States Patent
Uemura et al.

(10) Patent No.: US 10,820,223 B2
(45) Date of Patent: Oct. 27, 2020

(54) TERMINAL DEVICE, BASE STATION DEVICE, COMMUNICATION METHOD, AND INTEGRATED CIRCUIT

(71) Applicant: SHARP KABUSHIKI KAISHA, Sakai, Osaka (JP)

(72) Inventors: Katsunari Uemura, Sakai (JP); Shohei Yamada, Sakai (JP); Hidekazu Tsuboi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/745,822

(22) PCT Filed: Jul. 20, 2016

(86) PCT No.: PCT/JP2016/071260
§ 371 (c)(1),
(2) Date: Jan. 18, 2018

(87) PCT Pub. No.: WO2017/014229
PCT Pub. Date: Jan. 26, 2017

(65) Prior Publication Data
US 2018/0213427 A1 Jul. 26, 2018

(30) Foreign Application Priority Data

Jul. 22, 2015 (JP) .................... 2015-144726

(51) Int. Cl.
*H04W 24/10* (2009.01)
*H04W 88/02* (2009.01)
*H04W 88/08* (2009.01)

(52) U.S. Cl.
CPC ............ *H04W 24/10* (2013.01); *H04W 88/02* (2013.01); *H04W 88/08* (2013.01)

(58) Field of Classification Search
CPC ...... H04W 24/10; H04W 88/02; H04W 88/08
(Continued)

(56) References Cited

U.S. PATENT DOCUMENTS

2011/0250882 A1 10/2011 Gao et al.
2011/0287767 A1* 11/2011 Huang ................. H04L 43/00
455/436
(Continued)

FOREIGN PATENT DOCUMENTS

EP 3217701 A1 9/2017
EP 3322215 A1 5/2018
(Continued)

OTHER PUBLICATIONS

Huawei, Hisilicon, "Support of Discovery Signals measurement in TS 36.331", R2-145414, 3GPP TSG-RAN2 Meeting #88, San Francisco, USA, Nov. 17-21, 2014.
(Continued)

*Primary Examiner* — Obaidul Huq
(74) *Attorney, Agent, or Firm* — ScienBiziP, P.C.

(57) ABSTRACT

A terminal device, a base station device, a communication method, and an integrated circuit are provided for efficiently performing measurements. A base station device notifies a terminal device of a report configuration including information about an RSSI report, a measurement object indicating at least one frequency assumed as a frequency applicable for an RSSI measurement by the terminal device, and a measurement identifier for linking the report configuration to the measurement object. In a case where the information about the RSSI report is included in a report configuration associated with a measurement identifier, the terminal device assumes at least one frequency indicated by the measurement object associated with the report configuration as the frequency applicable for the RSSI measurement. In a case (Continued)

where at least one frequency to be reported is present, the terminal device reports an RSSI result measured at such an associated frequency, as a measurement result.

12 Claims, 13 Drawing Sheets

(58) Field of Classification Search
USPC .................................................. 370/241, 252
See application file for complete search history.

(56) References Cited

U.S. PATENT DOCUMENTS

| | | | |
|---|---|---|---|
| 2012/0003943 A1 | 1/2012 | Marinier et al. | |
| 2013/0100837 A1* | 4/2013 | Iwamura | H04L 5/0058 370/252 |
| 2013/0260741 A1 | 10/2013 | Yamada | |
| 2013/0315075 A1 | 11/2013 | Tamura et al. | |
| 2014/0119207 A1 | 5/2014 | Yamada | |
| 2014/0126547 A1 | 5/2014 | Tamura et al. | |
| 2015/0319661 A1* | 11/2015 | Jung | H04W 36/14 455/436 |
| 2016/0338118 A1* | 11/2016 | Vajapeyam | H04B 17/318 |

FOREIGN PATENT DOCUMENTS

| | | |
|---|---|---|
| WO | 2012/111260 A1 | 8/2012 |
| WO | 2013/112983 A2 | 8/2013 |

OTHER PUBLICATIONS

3rd Generation Partnership Project; Technical Specification Group Radio Access Network; Study on Licensed-Assisted Access to Unlicensed Spectrum; (Release 13), 3GPP TR 36.889 V1.0.1, (Jun. 2015) Valbonne, France.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.5.0 (Mar. 2015) Valbonne, France.

* cited by examiner

TERMINAL DEVICE, BASE STATION DEVICE, COMMUNICATION METHOD, AND INTEGRATED CIRCUIT

TECHNICAL FIELD

Embodiments of the present invention relate to a technology of a terminal device, a base station device, a communication method, and an integrated circuit, by which measuring of cells is efficiently performed.

BACKGROUND ART

The 3rd General Partnership Project (3GPP), which is a standardization project, has standardized the Evolved Universal Terrestrial Radio Access (EUTRA), in which high-speed communication is realized by adopting an orthogonal frequency division multiplexing (OFDM) communication scheme and flexible scheduling in a unit of prescribed frequency and time called a resource block. The EUTRA is also referred to as Long Term Evolution (LTE).

The 3GPP discusses LTE Advanced, which realizes higher-speed data transmission and has compatibility with LTE (LTE Advanced is also referred to as LTE-A). The LTE Advanced describes a technology that simultaneously connects to multiple cells and performs communication (a carrier aggregation technology or a dual connectivity technology) (NPL 1).

NPL 2 discusses Licensed-Assisted Access (LAA). The LAA, for example, is a technology that auxiliarily uses an unlicensed spectrum frequency as LTE, the unlicensed spectrum frequency being used by a wireless Local Area Network (LAN) and the like. Specifically, a terminal device and a base station device add a cell (a secondary cell) using an unlicensed spectrum frequency by a carrier aggregation technology in addition to a cell (a primary cell to be described later) using a licensed spectrum frequency, for performing communication. The unlicensed spectrum frequency, for example, belongs to an Industry-Science-Medical (ISM) band.

CITATION LIST

Non Patent Literature

NPL 1: 3GPP TS 36.300 V12.5.0 (2015-03) http://www.3gpp.org/DynaReport/36300.htm
NPL 2: 3GPP TS 36.889 V1.0.1 (2015-06) http://www.3gpp.org/DynaReport/36889.htm

SUMMARY OF INVENTION

Technical Problem

NPL 2 describes measuring of the size of signal energy for each frequency (RSSI measurement) in order to solve interference received in the terminal device from an undetected transmission point (a cell and an access point) in the base station device, so called a hidden node problem. However, specific RSSI measurement procedure and report procedure are neither disclosed nor implied in NPL 2. Particularly, in the measurement method in the related art, since a measurement result is reported to each cell, an efficient method for reporting the measurement result (e.g., RSSI) obtained for each frequency is not considered so far.

Embodiments of the present invention have been made in view of the above-described circumstances, and provide a technology related to a terminal device, a base station device, a communication method, and an integrated circuit, which enables efficient measurements.

Solution to Problem

To accomplish the object described above, the present invention has following measures. That is, a terminal device in one embodiment of the present invention is a terminal device, and in a case where information about an RSSI report is included in a report configuration associated with a measurement identifier that is configured, a measurement timing configuration included in a measurement object associated with the report configuration is configured on at least one frequency that is indicated by the measurement object, and an RSSI measurement indicated by the measurement timing configuration is performed in a applicable resource for the RSSI measurement.

Further, a base station device in one embodiment of the present invention is a base station device, and the base station device notifies a report configuration including information about an RSSI report; a measurement object indicating a applicable resource, in which an RSSI measurement is performed, and including a measurement timing configuration corresponding to at least one frequency; and a measurement identifier for linking the report configuration and the measurement object to each other.

Further, a communication method of a terminal device in one embodiment of the present invention is a communication method of a terminal device, in a case where information about an RSSI report is included in a report configuration associated with a measurement identifier that is configured, configuring a measurement timing configuration included in a measurement object associated with the report configuration on at least one frequency that is indicated by the measurement object; and performing an RSSI measurement indicated by the measurement timing configuration in a applicable resource for the RSSI measurement.

Further, a communication method of a base station device in one embodiment of the present invention is a communication method of a base station device, and the communication method includes at least notifying a report configuration including information about an RSSI report, a measurement object indicating a applicable resource, in which an RSSI measurement is performed, and including a measurement timing configuration corresponding to at least one frequency, and a measurement identifier for linking the report configuration and the measurement object to each other.

Further, an integrated circuit to be implemented in a terminal device in one embodiment of the present invention is an integrated circuit mounted in a terminal device, and in a case where information about an RSSI report is included in a report configuration associated with a measurement identifier that is configured, the integrated circuit being configured to cause at least the terminal device to perform a function of configuring a measurement timing configuration included in a measurement object associated with the report configuration on at least one frequency indicated by the measurement object, and a function of performing an RSSI measurement indicated by the measurement timing configuration in a applicable resource for the RSSI measurement.

Further, an integrated circuit to be implemented in a base station device in one embodiment of the present invention is an integrated circuit to be implemented in a base station device, for causing at least a terminal device to perform a function of notifying a report configuration including information about an RSSI report, a measurement object indicating a applicable resource, in which an RSSI measurement is performed, and including a measurement timing configuration corresponding to at least one frequency, and a measurement identifier for linking the report configuration and the measurement object to each other.

The present specification discloses embodiments in terms of a technology related to a terminal device, a base station device, a communication method, and an integrated circuit, for efficiently performing measurements; however, a communication scheme applicable to each embodiment is not limited to EUTRA or a communication scheme having compatibility with the EUTRA such as Advanced EUTRA.

For example, the technology described in the present specification may be used in various communication systems using Code Division Multiple Access (CDMA), Time Division Multiple Access (TDMA), Frequency Division Multiple Access (FDMA), Orthogonal FDMA (OFDMA), Single Carrier FDMA (SC-FDMA), other access schemes, and the like. In the present specification, a system and a network may be synonymously used.

Advantageous Effects of Invention

According to the embodiments of the present invention, a technology related to a terminal device, a base station device, a communication method, and an integrated circuit, which enable efficient measurements, are provided.

DESCRIPTION OF EMBODIMENTS

Figure 1:
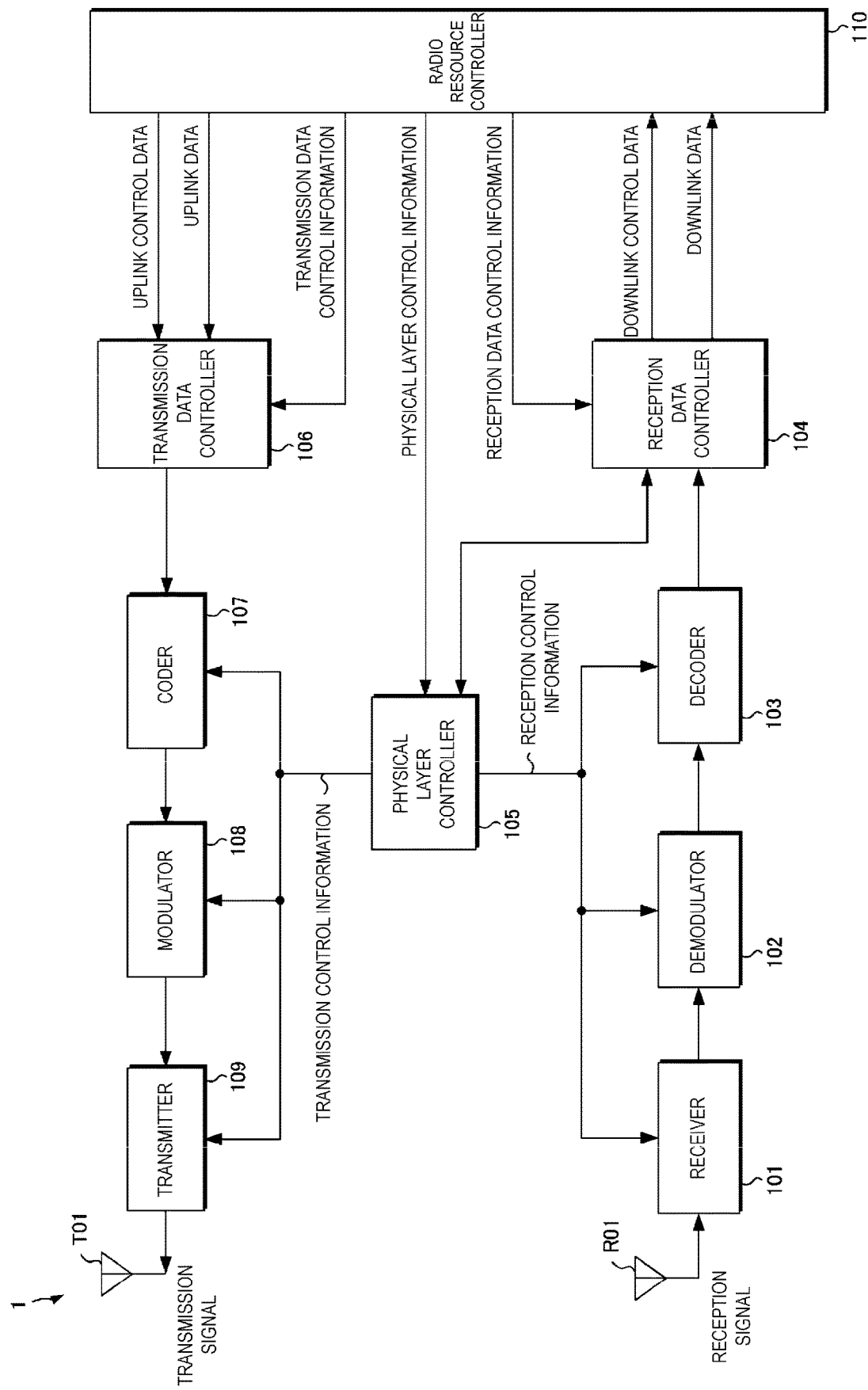
FIG. 1 is a block diagram illustrating an example of a schematic configuration of a terminal device according to an embodiment of the present invention.

A technology related to each embodiment of the present invention will be briefly described below.
Channel/Signal LTE (EUTRA) channels include logical channels, transport channels, and physical channels. A channel represents a medium used for signal transmission and/or reception, and the logical channels define a type of a data transmission service in which data is transmitted and/or received in a Medium Access Control (MAC) layer. A transport channels defines what characteristics of data to be transmitted via a radio interface has and how the data is transmitted.

A physical channel represents a physical medium carrying the data to be transported to a physical layer via the transport channel. In the present disclosure, the physical channel may be used synonymously with a signal. In a communication system having developed EUTRA (LTE and LTE-A), another physical channel may be added, the constitution (configuration) or format of the physical channel may be changed, or another constitution or format may be added; however, the description of each embodiment of the present invention will not be affected even in such a case.

In the EUTRA, scheduling of a physical channel or a physical signal is managed using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a certain frequency domain constituted of a set of multiple subcarriers (e.g., 12 subcarriers) on a frequency axis and a domain constituted of a certain transmission time slot (one slot).

In the EUTRA, a downlink will be described. The downlink logical channels include a Broadcast Control CHannel (BCCH), a Paging Control CHannel (PCCH), a Common Control CHannel (CCCH), a Dedicated Control CHannel (DCCH), and a Dedicated Traffic CHannel (DTCH).

The Broadcast Control CHannel (BCCH) is a logic channel used to broadcast system information. The Paging Control CHannel (PCCH) is a logic channel used to transmit paging information and is used when a network calls a terminal device and notifies update of the system information. The Common Control CHannel (CCCH) is a logic channel used to transmit control information between the terminal device and the network, and is used by a base station device when a state of the terminal device in the downlink is not shifted to a state (an RRC connected state: RRC_CONNECTED), in which Radio Resource Control (RRC) with the network has been established.

The Dedicated Control CHannel (DCCH) is a point-to-point bidirectional channel, and is a logic channel used to transmit dedicated control information between the terminal device and the network. The Dedicated Control CHannel (DCCH) is used between a terminal device in the RRC connected state and the base station device. The Dedicated Traffic CHannel (DTCH) is a point-to-point bidirectional channel, is a channel dedicated for one terminal device, and is a logic channel used to transmit user information (unicast data).

The downlink transport channels include a Broadcast CHannel (BCH), a Paging CHannel (PCH), and a DownLink Shared CHannel (DL-SCH).

The Broadcast CHannel (BCH) is broadcast to an entire cell by a fixed and predefined transport format. The DownLink Shared CHannel (DL-SCH) supports a Hybrid Automatic Repeat reQuest (HARQ), dynamic adaptive modulation (link adaptation) control, dynamic or quasi-static resource allocation, and Discontinuous Reception (DRX). The Paging CHannel (PCH) supports discontinuous reception broadcast to the entire cell.

The downlink physical channel and the physical signal of the EUTRA will be described.

A synchronization signal includes three types of Primary Synchronization Signals (PSSs) and Secondary Synchronization Signals (SSSs) including 31 kinds of codes that are interleaved in the frequency domain, and 504 patterns of cell identifiers (Physical Cell Identities; PCIs) for identifying base station devices and frame timing for radio synchronization are indicated by the combinations of the primary synchronization signals and the secondary synchronization signals. The terminal device identifies the physical cell ID of a received synchronization signal by cell search.

A downlink reference signal is classified into multiple types according to its use. For example, cell-specific RSs (cell-specific Reference Signals) are pilot signals transmitted with prescribed power to each cell and are downlink reference signals periodically repeated in the frequency domain and the time domain based on a prescribed rule. The terminal device receives the cell-specific RS and thus measures the reception quality of each cell. The terminal device also uses the cell-specific RS as a reference signal for demodulation of a physical downlink control channel or a physical downlink shared channel transmitted along with the cell-specific RS.

A sequence used for the cell-specific RS uses a sequence distinguishable among the cells. The cell-specific RS may be transmitted in all downlink subframes from the base station device or may be transmitted only in downlink subframes designated by the base station device. The terminal device may receive the cell-specific RS in all the downlink subframes or only in the downlink subframes designated by the base station device.

The downlink reference signal is also used for estimation of a downlink channel variation. The downlink reference signal used for the estimation of the channel variation is referred to as a "Channel State Information Reference Signal (CSI-RS or CSI Reference Signal)". The CSI reference signal may not be actually transmitted or may be transmitted with zero power. On the other hand, an actually transmitted CSI-RS may be referred to as a Non-Zero Power Channel State Information Reference Signal (NZP CSI-RS). A downlink radio resource used to measure an interference component may be referred to as a Channel State Information-Interference Measurement Resource (CSI-IMR) or a CSI-IM resource.

A downlink reference signal dedicatedly configured for the terminal device is referred to as a UE-specific Reference Signal (URS) or a Demodulation Reference Signal (DMRS), and is referred to for a channel compensation process for demodulating a physical downlink control channel, an enhanced physical downlink control channel, or a physical downlink shared channel.

A Physical Broadcast CHannel (PBCH) is transmitted for the purpose of reporting (configuring) a Master Information Block (MIB) commonly used among the terminal devices in a cell. The base station device reports (transmits) a master information block message including the MIB by the physical broadcast channel. Information reported to (configured for) the terminal device by the master information block message, that is, information reported by the MIB is configuration information and the like of a downlink frequency bandwidth, a system frame number, and a physical channel (PHICH) for Hybrid ARQ.

The base station device transmits cell common information, other than the master information block, to the terminal device by using a predefined System Information Block type 1 (SIB1) message in which a subframe position and a period are statically defined, and other types of system information messages system information block type 2 to type n (n is a natural number)) dynamically scheduled in a System Information window (SI-window designated with the system information block type 1.

Each of the master information block message, the system information block type 1 message, and the system information message is a layer 3 message (an RRC message). In the present specification, there is a case where the system information (the broadcast information) represents these RRC messages or information (information elements) reported in the master information block and each system information block.

The system information message is reported on the physical downlink shared channel in the radio resource indicated by the physical downlink control channel, and transmits one of the system information (the system information block type 2 to type n (SIB2 to SIBn (where n is a natural number)) classified according to its use to a corresponding system information window.

As the system information, a Cell Global Identifier (CGI), which indicates a cell-specific identifier, a Tracking Area Identifier (TAI) for managing a standby area in paging, random access configuration (common random access configuration) information, timing adjustment information, shared radio resource configuration information of each cell, neighboring cell list information of the same frequency (different frequencies and different RATs), and uplink access limitation information and the like are reported.

A Physical Downlink Control CHannel (PDCCH) is transmitted by using several OFDM symbols (e.g., 1 to 4 OFDM symbols) from the head of each subframe. The Enhanced Physical Downlink Control CHannel (EPDCCH) is a physical downlink control channel allocated to the OFDM symbols to which the Physical Downlink Shared CHannel (PDCCH) is allocated. The PDCCH or the EPDCCH is used for reporting the terminal device about radio resource allocation information according to scheduling of the base station device, control information indicating an adjustment amount for an increase or decrease in transmit power, and the like. Hereinafter, when only the Physical Downlink Control CHannel (PDCCH) is described, it represents physical channels of the PDCCH and the EPDCCH unless otherwise noted.

The terminal device needs to monitor a physical downlink control channel addressed to the terminal device itself and receive the physical downlink control channel addressed to the terminal device itself before transmitting and/or receiving a layer-2 message (MAC-CE) and a layer-3 message (paging, system information and the like), and thus acquire, from the physical downlink control channel, radio resource allocation information called uplink grant in a case of transmission and downlink grant (also called downlink assignment) in a case of reception. Note that the physical downlink control channel can be configured such that the physical downlink control channel is to be transmitted in the dedicated resource block domain allocated to each terminal device by the base station device, instead of transmission through the OFDM symbols described above.

A Physical Downlink Shared CHannel (PDSCH) is also used to report the terminal device of the layer-3 message such as paging and system information, in addition to downlink data. The radio resource allocation information of the physical downlink shared channel is indicated (reported) by the physical downlink control channel. The physical downlink shared channel is allocated to OFDM symbols other than the OFDM symbols used to transmit the physical downlink control channel and is transmitted. In other words, the physical downlink shared channel and the physical downlink control channel are time division multiplexed in a single subframe.

The Broadcast CHannel (BCH) is mapped to the Physical Broadcast CHannel (PBCH). The Paging CHannel (PCH) and the Downlink Shared CHannel (DL-SCH) are mapped to the Physical Downlink Shared CHannel (PDSCH). The Physical Downlink Control CHannel (PDCCH) is used solely for physical channels.

In the downlink, the Paging Control CHannel (PCCH) is mapped to the Paging CHannel (PCH). The Broadcast Control CHannel (BCCH) is mapped to the Broadcast CHannel (BCH) and the DownLink Shared CHannel (DL-SCH). The Common Control CHannel (CCCH), the Dedicated Control CHannel (DCCH), and the Dedicated Traffic CHannel (DTCH) are mapped to the DownLink Shared CHannel (DL-SCH).

Next, an uplink in the EUTRA will be described. The uplink logical channels include a Common Control CHannel (CCCH), a Dedicated Control CHannel (DCCH), and a Dedicated Traffic CHannel (DTCH).

The Common Control CHannel (CCCH) is a logical channel used to transmit control information between the terminal device and the network and is used by the terminal device when a state of the terminal device in the uplink is not shifted to a state (an RRC connected state: RRC_CONNECTED) in which Radio Resource Control (RRC) with the network has been established (that is, an RRC idle state: RRC_IDLE).

The Dedicated Control CHannel (DCCH) is a point-to-point bidirectional channel and is used to transmit dedicated control information between the terminal device and the network. The Dedicated Control CHannel (DCCH) may be used between a terminal device in the RRC connected state and the base station device. The Dedicated Traffic CHannel (DTCH) is a point-to-point bidirectional channel, is a channel dedicated for one terminal device, and is a logic channel used to transmit user information (unicast data).

The uplink transport channels include an Uplink Shared CHannel (UL-SCH) and a Random Access CHannel (RACH).

The Uplink Shared Channel (UL-SCI) supports a Hybrid Automatic Repeat reQuest (HARQ), dynamic adaptive modulation control, dynamic or quasi-static resource allocation, and Discontinuous Transmission (DTX). The Random Access CHannel (RACH) is used to transmit limited control information.

The uplink physical channel and physical signal of the EUTRA will be described.

A Physical Uplink Control CHannel (PUCCH) is used to perform a reception confirmation response (ACKnowledgment/Negative ACKnowledgment (ACK/NACK) for downlink data transmitted by using the physical downlink shared channel, downlink channel (Channel State) Information (CSI), and an uplink radio resource allocation request (a radio resource request and a Scheduling Request (SR)).

The CSI includes a Channel Quality Indicator (CQI), a Precoding Matrix Indicator (PMI), a Precoding Type Indicator (PTI), and a Rank Indicator (RI). Each indicator may be written as indication.

A Physical Uplink Shared CHannel (PUSCH) mainly transmits uplink data and uplink control data, and may also include control data such as CSI and ACK/NACK. Further, the physical uplink shared channel is also used by the terminal device to report the base station device of uplink control information as the layer 2 message and the layer 3 message, in addition to the uplink data. Similar to the downlink, radio resource allocation information of the physical uplink shared channel is indicated by the physical downlink control channel.

An uplink reference signal (also referred to as "uplink pilot signal" or "uplink pilot channel") includes a DeModulation Reference Signal (DMRS) to be used by the base station device to demodulate the Physical Uplink Control CHannel (PUCCH) and/or Physical Uplink Shared CHannel (PUSCH), and a Sounding Reference Signal (SRS) to be mainly used by the base station device to estimate an uplink channel state. Further, the sounding reference signals are categorized into a periodic Sounding Reference Signal (periodic SRS), which is transmitted periodically, and an aperiodic Sounding Reference Signal (aperiodic SRS), which is transmitted when transmission is instructed by the base station device.

A Physical Random Access CHannel (PRACH) is a channel used for the notification (configuration) of a preamble sequence and includes a guard time. The preamble sequence is configured such that the base station device is notified of the information with multiple sequences. For example, when 64 sequences are available, 6-bit information can be provided to the base station device. A physical random access channel is used by the terminal device as a means for accessing the base station device.

The terminal device uses the physical random access channel to request an uplink radio resource when no physical uplink control channel is configured or to request the base station device for timing adjustment information (also referred to as Timing Advance (TA)) necessary for matching an uplink transmission timing to a reception timing window of the base station device. Further, the base station device can request the terminal device to start a random access procedure, by using the physical downlink control channel.

In the uplink, the Common Control CHannel (CCCH), the Dedicated Control CHannel (DCCH), and the Dedicated Traffic CHannel (DTCH) are mapped to the Uplink Shared CHannel (UL-SCH).

The Uplink Shared CHannel (UL-SCH) is mapped to the Physical Uplink Shared CHannel (PUSCH). The Random Access CHannel (RACH) is mapped to the Physical Random Access CHannel (PRACH). The Physical Uplink Control CHannel (PUCCH) is used as the dedicated physical channels.

Since other physical channels and other physical signals have no strong relation to each embodiment of the present invention, a detailed description thereof is omitted. The physical channels and physical signals that are not described include a Physical Control Format indicator CHannel (PCFICH), a Physical Hybrid ARQ Indicator CHannel (PHICH), a Physical Multicast CHannel (PMCH) and the like.

A logic channel, a transport channel, a physical channel, and a physical signal (these are also collectively referred to as side link channels) for direct communication between terminal devices (Device to Device (D2D)) are also used in the EUTRA, but a description thereof is also omitted.

Protocol Stack

Figure 11:
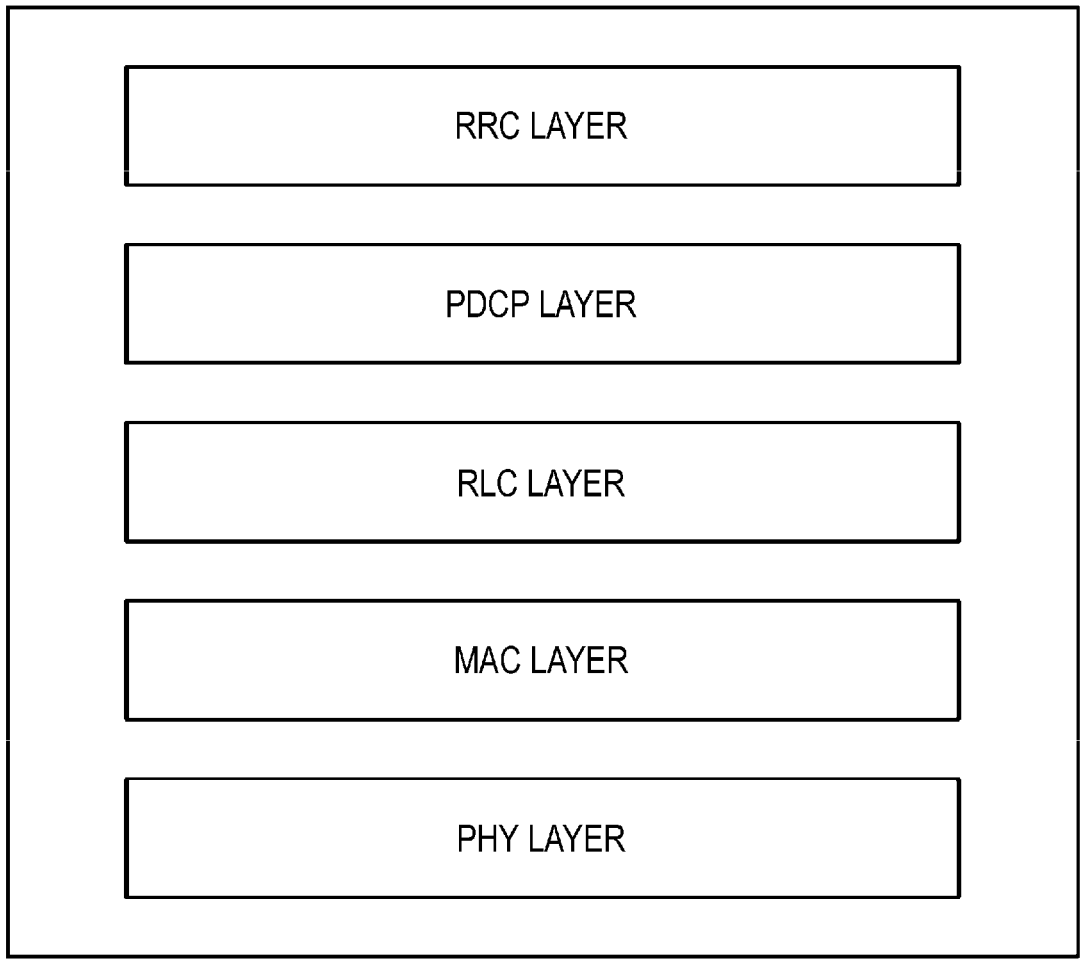
FIG. 11 is a diagram illustrating a protocol stack for handling control data in a terminal device and a base station device according to an embodiment of the present invention.
Figure 12:
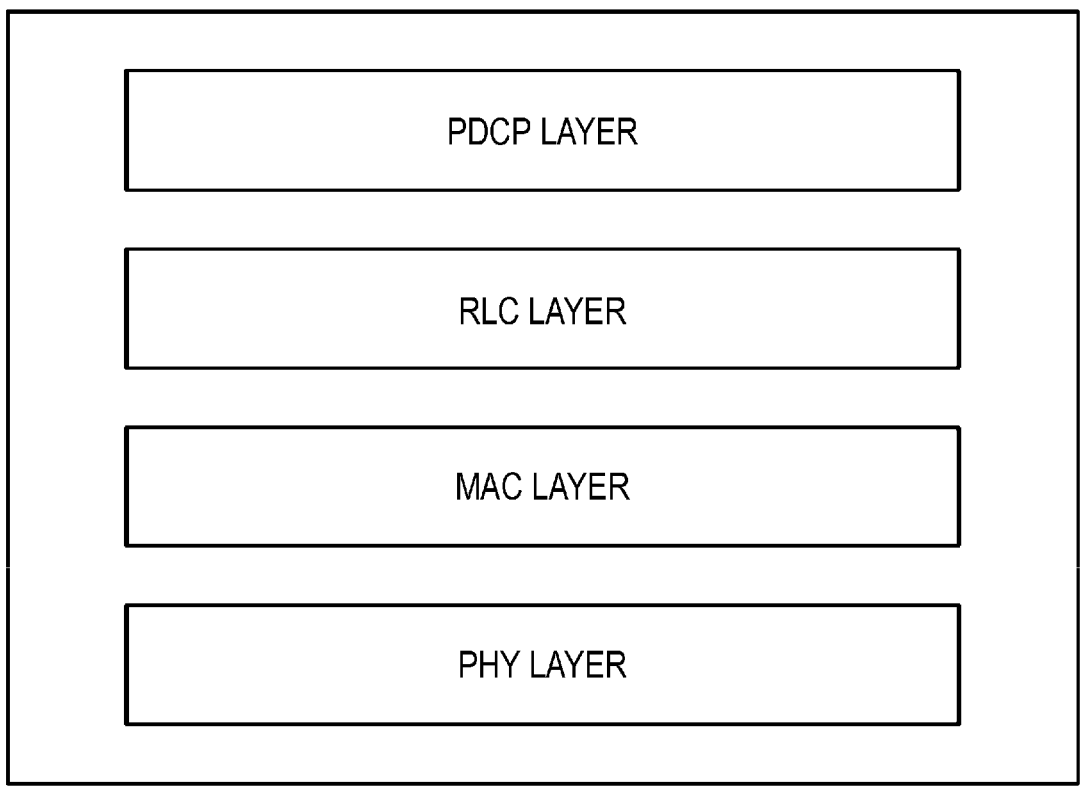
FIG. 12 is a diagram illustrating a protocol stack for handling user data in a terminal device and a base station device according to an embodiment of the present invention.

As illustrated in FIG. 11, a protocol stack for handling the control data of the terminal device and the base station device is classified into at least a PHYsical (PHY) layer, a MAC layer, an RLC layer, a PDCP layer, and an RRC layer. As illustrated in FIG. 12, a protocol stack for handling the user data of the terminal device and the base station device is classified into at least a PHYsical (PHY) layer, a MAC layer, an RLC layer, and a PDCP layer. The terminal device and/or the base station device have entities for performing functions and roles of each layer in the respective layers.

An order of each of the layers of FIG. 11 and FIG. 12 indicates high/low between layers. For example, the RRC layer is a higher layer of the PDCP layer, the RLC layer, the MAC layer, and the PHY layer. The MAC layer is a lower layer of the RRC layer, the PDCP layer, the RLC layer and a higher layer of the PHY layer.

The PHYsical layer (PHY layer) uses the physical channels to provide a transmission service to a higher layer. The PHY layer is connected with the Medium Access Control (MAC) layer via the transport channels. Data is moved among the MAC layer, the PHY layer, and layers via the transport channels. Data is transmitted and/or received between the PHY layers of the terminal device and the base station device via the physical channels.

The MAC layer is connected with the Radio Link Control layer (RLC layer) via the logical channels. The logical channels are classified depending on the type of information to be transmitted, and are divided into the control channels transmitting the control information and the traffic channels transmitting the user information.

The MAC layer has a function of performing mapping between the logic channels and the transport channels, control of the PHY layer for performing Discontinuous Reception (DRX) and Discontinuous Transmission (DTX), notification of transmit power information, HARQ (error correction) control, priority handling between terminal devices by timing scheduling, priority handling of the logic channels, transmission format selection, and the like. The functions of the MAC layer are performed by the MAC entity.

The RLC layer has a function of performing transmission of data (Protocol Data Unit (PDU)) received from a higher layer, an ARQ (error correction) function, RLC data Segmentation and Concatenation, PDU re-segmentation, re-ordering of a PDU order, data redundancy detection, protocol error detection, RLC data discard and the like. The functions of the RLC layer are performed by the RLC entity.

The Packet Data Convergence Protocol (PDCP) layer has a function of performing transmission of user data or control data, header compression for efficiently transmitting an IP packet (user data) in a radio duration, management of a sequence number, concealment and concealment cancellation of the user data or the control data, integrity protection of the control data, redundancy detection of data, and the like. The functions of the PDCP layer are performed by the PDCP entity.

In the Radio Resource Control layer (RRC layer), only the control information is defined. The RRC layer has a function of performing notification of system information (including NAS common information, cell selection parameters, neighboring cell information, a common channel configuration, and Earthquake Tsunami Warning System (ETWS)/Commercial Mobile Alert System (CMAS)), RRC connection control (paging, establishment/change/release of RRC connection, integrity protection, a concealment configuration, mobility control, configuration/change/release of a Radio Bearer (RB), a radio configuration control (allocation/change of an ARQ configuration, a HARQ configuration, a DRX configuration and the like), addition/change/release of a secondary cell, QoS control, and restoration from radio link failure) and the like.

The functions of the RRC layer also include inter-RAT mobility, general protocol error handling, measurement configuration and report, preservation and report of terminal device logs, and the like. The functions of the RRC layer are performed by the RRC entity.

The RBs are classified into two types of RBs of a Signaling Radio Bearer (SRB) and a Data Radio Bearer (DRB). The SRB is used as a path for transmitting the layer 3 message that is the control information. The DRB is used as a path for transmitting the user information. The RBs are configured (added, changed, and released) between the RRC entities of the base station device and the terminal device.

The layer-3 message is a message handled in a protocol for a Control-Plane (C-Plane) exchanged between the RRC (Radio Resource Control) entities of the terminal device and the base station device, and may be used synonymously with RRC signaling or RRC message. A protocol handling user data is referred to as "User-Plane (UP (U-Plane))" in contrast to the "control plane".

Discovery Signal

The base station device may transmit a Discovery Signal (DS) to the terminal device. The discovery signal is also referred to as a Discovery Reference Signal (DRS). The discovery signal may be transmitted in a discovery signal measurement timing configuration occasion (DMTC Occasion (hereinafter, referred to as a discovery signal transmission occasion)) predefined by a Discovery signal Measurement Timing Configuration (DMTC).

The discovery signal in the discovery signal transmission occasion (DMTC Occasion) may be transmitted from a base station device having turned off downlink transmission (stopped the downlink transmission). In other words, the base station device having turned off downlink transmission transmits only the discovery signal in a measurement duration (that is, the discovery signal transmission occasion) based on the discovery signal measurement timing configuration, and stops the downlink transmission in other durations.

The base station device reports the terminal device of the discovery signal measurement timing configuration by using the RRC signaling. The terminal device notified of the discovery signal measurement timing configuration performs measurement by applying the discovery signal measurement timing configuration to a frequency to be measured. That is, the terminal device measures the discovery signal in the measurement duration (that is, the discovery signal transmission occasion) based on the discovery signal measurement timing configuration. Note that it may be assumed that in subframes other than the discovery signal transmission occasion, the discovery signal is not transmitted to the terminal device notified of the discovery signal measurement timing configuration.

The discovery signal may be configured with a combination of one or multiple physical signals. For example, the discovery signal may be configured with the PSS, the SSS, or the CRS. The terminal device may measure RSRP and RSRQ by using the CRS, which is a discovery signal. Moreover, the discovery signal may include the CSI-RS in addition to the PSS, the SSS, and the CRS. The terminal device may measure the RSRP and the RSRQ by using the CSI-RS, which is a discovery signal.

The number of subframes of the discovery signal transmission occasion (DMTC Occasion) of a cell is 1 to 5 in a frame structure type 1 (FDD) and is 2 to 5 in a frame structure type 2 (TDD). The number of subframes is indicated by a discovery signal duration (ds-OccasionDuration), and is notified by the base station device through the RRC signaling. The terminal device may assume that there is one discovery signal transmission occasion for each period configured by the RRC signaling (a discovery signal measurement timing configuration period or DMTC periodicity (dmtcperiodicity)).

Each physical signal may be assumed as follows. The CRS is transmitted through an antenna port 0 in all downlink subframes and downlink time slots (DwPTS: Downlink Pilot Time Slot) of all special subframes (subframes in which switching of an uplink and a downlink occurs in the TDD) in the discovery signal duration. The PSS is transmitted in an initial subframe of the discovery signal duration in the FDD. Alternatively, the PSS is transmitted in a second subframe of the discovery signal duration in the TDD. The SSS is transmitted in an initial subframe of the discovery signal duration. The CSI-RS is transmitted in zero or one or more subframes in the discovery signal duration, and its power is transmitted with non-zero (that is, CSI-RS of non-zero power).

Figure 13A:
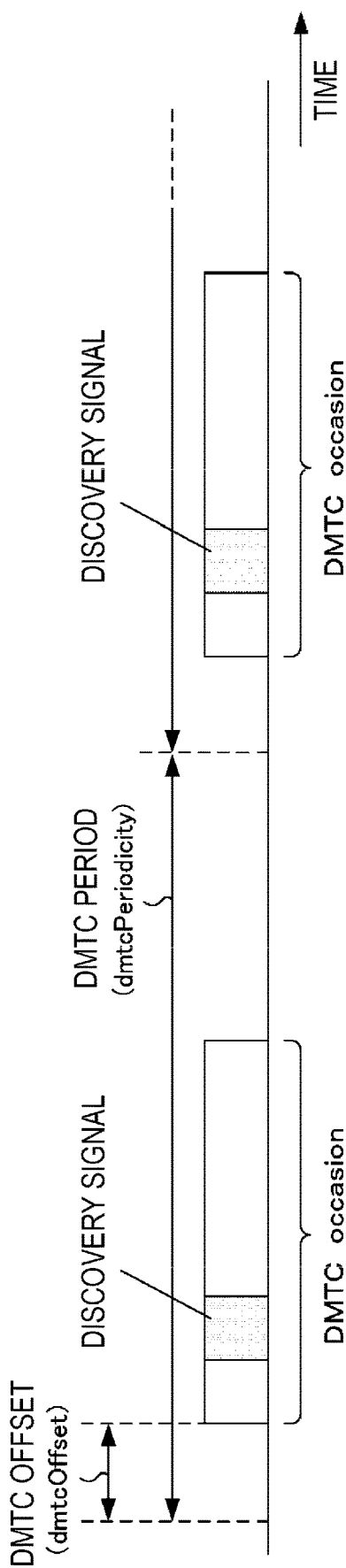
FIG. 13A and FIG. 13B are diagrams illustrating a discover signal according to an embodiment of the present invention.
Figure 13B:
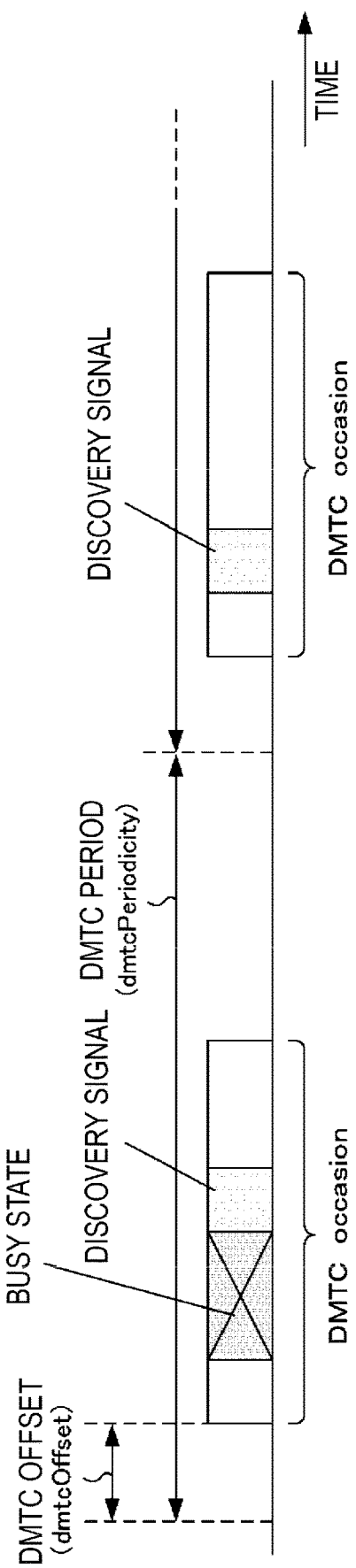

FIG. 13A and FIG. 13B are diagrams illustrating the discovery signal according to the embodiment of the present invention. FIG. 13A is a diagram illustrating a transmission timing of a known discovery signal and parameters related to the discovery signal. A discovery signal transmission occasion (DMTCoccasion) exists at an interval of DMTC periodicity. The discovery signal transmission occasion (DMTCoccasion) starts from a timing delayed from a head frame of the DMTC periodicity (dmtcperiodicity) by a DMTC offset (dmtcOffset). The Discovery Signal (DS) is transmitted among discovery signal durations (ds-Occasion-Durations).

FIG. 13B is a diagram illustrating a transmission timing of a discovery signal applied to an unlicensed band and parameters related to the discovery signal. A relation among a discovery signal transmission occasion (DMTCoccasion), DMTC periodicity (dmtcperiodicity), and a DMTC offset (dmtcOffset) is equal to that in the related art (FIG. 13A). In an unlicensed band (an LAA cell), a busy state, in which a base station device is not able to transmit signals, occurs based on LBT. When the busy state occurs in the discovery signal transmission occasion (DMTCoccasion), there is a case where a transmission timing of a discovery signal is shifted until the busy state is released as illustrated in FIG. 13B.

That is, when the busy state is released in the discovery signal transmission occasion (DMTCoccasion) (based on the base station device re-transmits the discovery signal in a remaining discovery signal transmission occasion (DMTCoccasion), and when it is not possible to detect the discovery signal at a predetermined timing, a terminal device considers that the discovery signal is not transmitted by the busy state and attempts to detect the discovery signal in the remaining discovery signal transmission occasion (DMTCoccasion). That is, the terminal device attempts to detect the discovery signal at a timing different from that in the related art.

Radio Network

A communicable range (communication area) at each frequency controlled by the base station device is considered to be a cell. Here, the communication area covered by the base station device may be different in size and shape for each frequency. Moreover, the covered area may be different for each frequency. A radio network, in which cells having different types of base station devices and different cell radii coexist in an area on the same frequency or different frequencies to form a single communication system, is referred to as a heterogeneous network.

The terminal device operates by assuming the inside of a cell as a communication area. When the terminal device moves from a cell to a different cell, the terminal device moves to an appropriate different cell through a cell reselection procedure at the time of having no radio connection (during no communication) and through a handover procedure at the time of having radio connection (during communication). An appropriate cell is generally a cell determined that access from the terminal device is not prohibited based on information designated by the base station device and that downlink reception quality satisfies a predetermined condition.

The base station device manages a cell, which is an area where terminal devices can communicate with the base station device, for each frequency. A single base station device may manage multiple cells. Cells are classified into multiple types of cells depending on the sizes of areas (cell sizes) that allow communication with terminal devices. For example, cells are classified into macro cells and small cells. In general, the small cells are cells that cover several-meter radius to several tens of meters. Further, the small cells are also classified into femto cells, pico cells, nano cells, and the like depending on the sizes of their own areas.

When a terminal device can communicate with a base station device, a cell configured so as to be used for communication with the terminal device is referred to as a serving cell while the other cells not used for the communication are referred to as "neighboring cells", among cells of the base station device.

Carrier Aggregation

Further, the terminal device and the base station device may employ a technology for aggregating frequencies (component carriers or frequency bands) of multiple different frequency bands through carrier aggregation and treating the aggregated frequencies as a single frequency (frequency band). In the carrier aggregation, the component carrier is categorized as an uplink component carrier corresponding to the uplink and a downlink component carrier corresponding to the downlink. In the present specification, the frequency and the frequency band may be used synonymously.

For example, when five component carriers each having a frequency bandwidth of 20 MHz are aggregated through carrier aggregation, a terminal device capable of carrier aggregation performs transmission and/or reception by assuming that the aggregated carriers have a frequency bandwidth of 100 MHz. Note that component carriers to be aggregated may have contiguous frequencies or frequencies some or all of which are discontinuous. For example, when available frequency bands are a band of 800 MHz, a band of 2 GHz, and a band of 3.5 GHz, a component carrier may be transmitted in the band of 800 MHz, another component carrier may be transmitted in the band of 2 GHz, and yet another component carrier may be transmitted in the band of 3.5 GHz.

It is also possible to aggregate multiple contiguous or discontinuous component carriers of the same frequency band. The frequency bandwidth of each component carrier may be narrower (e.g., 5 MHz or 10 MHz) than the receivable frequency bandwidth (e.g., 20 MHz) of the terminal device, and frequency bandwidths to be aggregated may be different from each other. The frequency bandwidth may be similar to any of the frequency bandwidths of the known cells in consideration of compatibility, but may be a frequency bandwidth different from any of the frequency bands of the known cells.

Note that the number of uplink component carriers to be allocated to (configured for or added for) the terminal device by the base station device may be the same as or fewer in number than downlink component carriers.

A cell including uplink component carriers and downlink component carriers having cell-specific connection with the uplink component carriers is managed by the terminal device and the base station device as a Primary Cell (PCell). Further, a cell including component carriers other than those of the primary cell is managed by the terminal device and the base station device as a Secondary Cell (SCell). A frequency of the primary cell is referred to as a primary frequency and a frequency of the secondary cell is referred to as a secondary frequency.

The terminal device receives a paging message, detects update of broadcast information, carries out an initial access procedure, configures security information, and the like in the primary cell, and may not perform these operations in the secondary cell. The primary cell and the secondary cell are collectively referred to as a serving cell.

Note that one or multiple LAA cells may be aggregated through the carrier aggregation. In this case, the LAA cell may be added as the secondary cell.

The primary cell is not subjected to control of activation and deactivation (that is, the primary cell is assumed to be always activated), and the secondary cell has a cell state depending on activity of the Activation and the Deactivation. In relation to the cell state, a state (Activation state) in which a cell has been activated is referred to as an Activated state, and a state (Deactivation state) in which a cell has not been activated is referred to as a Deactivated state.

In relation to the state of a cell (the secondary cell), the state change may be explicitly designated (notified or instructed) from the base station device, or the state may also be changed based on timer information (a secondary cell deactivation timer; a deactivation timer) counted by the terminal device for each component carrier (secondary cell).

The carrier aggregation is communication using multiple component carriers (frequency bands) by multiple cells and is also referred to as cell aggregation. The terminal device may have radio connection with the base station device via a relay station device (or repeater) for each frequency. That is, the base station device of each embodiment of the present invention may be replaced with the relay station device.

LAA

An unlicensed spectrum is referred to as an unlicensed band or a non-licensed band. A cell, which uses an unlicensed band frequency and is configured as an additional resource for a cell of a licensed band frequency, is referred to as a LAA cell. A frequency used by the LAA cell may be commonly used by other communication systems and/or other operators. When the frequency of the LAA cell is commonly used, it is necessary to consider fairness with other communication systems and/or other operators. That is, in communication in the LAA cell, a fair frequency sharing technology (method) may be employed desirably.

An example of the fair frequency sharing technology is Listen-Before-Talk (LBT). In the LBT, a base station device or a terminal device identifies (detects, assumes, or determines) whether a frequency of an unlicensed band is idle (is in an empty state) or is busy (is in a non-empty state) by measuring (detecting) power (an interference signal, received power, a received signal, noise power, or a noise signal) and the like of the frequency before transmitting a signal with the frequency of the unlicensed band. A period in which a frequency is idle is also referred to as a silent period.

When the base station device or the terminal device identifies that the frequency is idle based on the LBT, the base station device or the terminal device can transmit a signal at a predetermined timing in the LAA cell. When the base station device or the terminal device identifies that the frequency is busy based on the LBT, the base station device or the terminal device should avoid transmitting a signal at a predetermined timing in the LAA cell. As described above, when the LBT is used, interference can be controlled not to be applied to signals transmitted by other communication systems and/or other base station devices or terminal devices including other LTE operators.

The LBT procedure is defined as a mechanism that Clear Channel Assessment (CCA) is applied before a base station device or a terminal device uses a frequency (a channel). The CCA represents that to identify whether a frequency is idle or busy at a transmission timing, detection of signal energy (the presence or absence of a signal) using an appropriate threshold level at the frequency is performed. In the present embodiment, the definition of the CCA may be similar to that of the LBT.

In the CCA, various methods can be used for detecting the presence or absence of other signals. For example, the CCA may be performed based on whether interference power at a frequency exceeds a threshold value. Further, for example, the CCA may be performed based on whether the received power (signal strength) of a predetermined signal or a channel at a frequency exceeds a threshold value. The threshold value may be prescribed, may be reported by system information or a dedicated radio resource control message from the base station device in a case of the terminal device, or may be reported from an upper radio station device (e.g., a MME entity), in a case of the base station device.

For example, the terminal device or the base station device may perform the CCA by measuring a Received Signal Strength Indicator (RSSI) of a frequency. The RSSI is total received power including power from a serving cell or a neighboring cell with the same channel, interference power from an adjacent channel, thermal noise power, and the like, and serves as an index indicating signal strength (received strength).

The LAA cell may be defined as a cell different from a known secondary cell in the licensed band. For example, the LAA cell may be notified of a configuration different from that of a secondary cell using the licensed band. The LAA cell may be defined as a form of a secondary cell. The secondary cell of the related art is also referred to as a first secondary cell and the LAA cell is also referred to as a second secondary cell. Further, the primary and secondary cell of the related art are also referred to as a first serving cell and the LAA cell is also referred to as a second serving cell.

The unlicensed band has a frequency different from that of the licensed band allocated to a predetermined operator as a dedicated frequency. For example, the unlicensed band is a frequency of a frequency band freely available by a non-operator such as a wireless LAN. Further, for example, the unlicensed band has a frequency not configured in dual connectivity or a stand-alone mode. That is, the frequency of the unlicensed band has a frequency not configurable for a primary cell (or a primary secondary cell) and configurable only for a secondary cell.

With the advance of technology, a frequency configured for the LAA cell is not limited to the unlicensed band, and may be configured for the dual connectivity or the stand-alone mode. That is, in the future, the frequency of the unlicensed hand may be used in the primary cell (or the primary secondary cell).

The LAA cell may be a cell using a scheme different from the known scheme in relation to a configuration of a radio frame, a physical signal, a physical channel and the like in the LTE, a L1 procedure, a L3 procedure (an RRC procedure and a measurement method) and the like.

For example, in the LAA cell, a part of a predetermined signal and/or channel configured for (transmitted to) the primary cell and/or secondary cell of the related art may not be configured (transmitted). The predetermined signal and/or channel includes the CRS, the DS, the PDCCH, the EPDCCH, the PDSCH, the PSS, the SSS, the PBCH, the PHICH, the PCFICH, the CSI-RS and the like.

For example, signals and/or channels not configured for the LAA cell are described as follows. Signals and/or channels described below may be combined with one another for use. In the present embodiment, the signals and/or the channels not configured for the LAA cell may be regarded as signals and/or channels expected not to be transmitted from the LAA cell by a terminal.

(1) In the LAA cell, the control information of the physical layer may not be transmitted through the PDCCH, and may be transmitted through only the EPDCCH.

(2) In the LAA cell, the CRS, the DMRS, the URS, the PDCCH, the EPDCCH, and/or the PDSCH may not necessarily be transmitted in all subframes, and the terminal device may not necessarily assume transmission in all the subframes.

(3) In the LAA cell, the terminal device assumes that the DRS, the PSS and/or the SSS are transmitted in a designated subframe duration.

For example, in the LAA cell, only the downlink component carrier or the subframe is defined, and only the downlink signal and/or channel are transmitted. That is in the LAA cell, the uplink component carrier or the subframe is not defined, and the uplink signal and/or channel is not transmitted.

Measurement

Measurement results measured in the physical layer include a Reference Signal Received Power (RSRP), a Received Signal Strength indicator (RSSI), a Reference Signal Received Quality (RSRQ), and the like.

The RSRP is defined as received power of the downlink reference signal. The RSRQ is defined as received quality of the downlink reference signal. The RSRQ is defined by a ratio of the RSRP and the RSSI and is calculated from an equation: NRSRP/the RSSI. In the equation above, N denotes the number of resource blocks corresponding to an RSSI measurement bandwidth, and a numerator and a denominator of the RSRQ include a set of the same number of resource blocks.

RSSI in the ETURA (E-UTRA carrier RSSI) includes a value obtained by averaging (linearly averaging) total received power observed from only one or multiple OFDM symbols in one or multiple measurement subframes. In other words, the RSSI is a value obtained by linearly averaging total received power of OFDM symbols including CRS (a radio resource mapped to an antenna port 0) of the antenna port 0. The RSSI is measured in a measurement bandwidth of N resource blocks. When RSRQ measurement using all OFDM symbols is notified (instructed or configured) from an upper layer, the RSSI is measured using all the OFDM symbols (OFDM symbols including the CRS and OFDM symbols including no CRS).

Next, a measurement control method (a measurement method and a measurement procedure) in the terminal device will be described. The base station device notifies the terminal device of a measurement configuration by using a radio resource control connection reconfiguration (RRCConnectionReconfiguration) message which is the RRC message.

The terminal device configures measurement parameters (information elements) included in the received measurement configuration, and performs measurement of a serving cell and a neighboring cell (including a listed cell and/or a detected cell, event assessment of a measurement event, and a measurement report according to notified measurement parameters. The listed cell is a cell notified as a neighboring cell list included in measurement object(s), and the detected cell is a cell (a cell detected by the terminal device itself) detected by the terminal device at a frequency indicated by the measurement object but not listed to the measurement object.

The measurement includes intra-frequency measurement, inter-frequency measurement, and inter-radio access technology measurement (inter-RAT measurement). The intra-frequency measurement is measurement at a downlink frequency of the serving cell. The inter-frequency measurement is measurement at a frequency different from the downlink frequency of the serving cell. The inter-RAT measurement is measurement in a Radio Access Technology (RAT) different from a radio technology (e.g., the EUTRA) of the serving cell.

The measurement configuration includes, as measurement parameters, a measurement identifier (measId), measurement object(s), reporting configuration(s), a quantity configuration (quantityConfig), a measurement gap configuration (measGapConfig), serving cell quality threshold (s-Measure), RSRQ measurement on all symbols (measRSRQ-On All Symbols) and the like.

The quantity configuration (quantity Config) designates a Layer 3 (L3) filtering coefficient when an associated measurement object is the EUTRA. The L3 filtering coefficient configures a ratio of the latest measurement result and the past measurement result. The filtering result is used for event assessment in the terminal device. The event assessment indicates determination regarding whether triggering criteria of a measurement event performed in the terminal device and indicated by a report configuration are satisfied. The L3 filtering coefficient is dedicatedly notified for each quantity (i.e., for each RSRP, RSRQ, and RSSI) to be measured.

When the RSRQ measurement on all symbols (measRSRQ-On All Symbols) is configured, the terminal device measures RSRQ in all OFDM symbols. That is, in the RSSI measurement for obtaining the RSRQ, the RSSI is measured using all the OFDM symbols.

The measurement identifier (measId) is used to link (correlate) the measurement object and the reporting configuration to each other, and specifically, in the measurement configuration, the measurement identifier (measId), and one measurement object identifier (measObjectId) and one report configuration identifier (reportConfigId), which are linked, are configured by the base station device and are notified to the terminal device. That is, the measurement identifier links one measurement object and one reporting configuration to each other. The measurement configuration can be added, corrected, or deleted with respect to a correspondence relation (link) among the measurement identifier, the measurement object, and the reporting configuration.

The measurement object is configured for each Radio Access Technology (RAT) (e.g., UTRA-FDD, UTRA-TDD, GERAN, cdma 2000 and the like) or for each frequency. Further, the reporting configuration includes a configuration for the EUTRA and a configuration for the RAT other than the EUTRA.

The measurement object includes a measurement object EUTRA (measObjectEUTRA) correlated with a measurement object identifier, and the like. The measurement object identifier is an identifier used to identify configurations of measurement objects. The configuration of the measurement object is configured for each Radio Access Technology (RAT) or for each frequency as described above. The measurement object EUTRA, which is a measurement object for the EUTRA, configures information to be applied to an associated EUTRA frequency and a cell with the EUTRA frequency. Measurement objects EUTRA with different frequencies are handled as different measurement objects and different measurement object identifiers are allocated.

The measurement object EUTRA asObjectEUTRA) can include a carrier frequency (carrierFreq), an allowed measurement bandwidth (AllowedMeasBandwidth), an offset frequency (offsetFreq), information about a neighboring cell list, information about a black list, wideband RSRQ measurement (widebandRSRQ-Meas), and the like. Other parameters may be included in the measurement object EUTRA.

Next, information included in the measurement object EUTRA will be described. The EUTRA carrier frequency indicates a frequency serving as a measurement object. The allowed measurement bandwidth (AllowedMeasBandwidth) indicates a maximum allowed measurement bandwidth when RSRP and RSRQ are measured at the carrier frequency serving as a measurement object, and is expressed by the number of resource blocks. The offset frequency (offsetFreq) indicates an offset value to be applied at the frequency serving as a measurement object.

The wideband RSRQ measurement (widebandRSRQ-Meas) is configured when the allowed measurement bandwidth (AllowedMeasBandwidth) is 50 resource blocks (i.e., 10 MHz) or more. The wideband RSRQ measurement is notified with a true value, and in the case of TRUE, the terminal device is required to perform RSRQ measurement at a bandwidth wider than 6 resource blocks indicating a minimum value of the allowed measurement bandwidth. In this case, the terminal device measures RSSI at a bandwidth wider than the 6 resource blocks.

The measurement object EUTRA can also include a discovery signal measurement configuration (measDS-Config). The discovery signal measurement configuration (measDS-Config) can also further include configuration information about CSI-RS resource measurement (a CSI-RS resource measurement configuration (MeasCSI-RS-Config)) and a discovery signal measurement timing configuration. The CSI-RS resource measurement configuration can also be configured for each CSI-RS resource in a plural number. The CSI-RS resource indicates a resource element through which the CSI-RS can be transmitted.

Hereinafter, there is a case where the measurement object EUTRA or a measurement object corresponding to the RAT other than the EUTRA will be simply described as a measurement object.

The discovery signal measurement timing configuration includes information indicating a period and a time offset of the discovery signal transmission occasion (DMTCoccasion) (a discovery signal measurement timing configuration period offset or a DMTC period offset (dmtcPeriodOffset)) and information indicating a length of the discovery signal transmission occasion (a discovery signal duration (ds-OccasionDuration)). An initial subframe of the discovery signal transmission occasion is generated in a system frame number and a subframe number of a primary cell matching with conditions.

The dmtcPeriodOffset indicates a DMTC time period (a DMTC period (dmtcPeriodicity)) and a time offset in the DMTC period (a DMTC offset (dmtcOffset)). Note that the dmtcPeriodOffset may be desirably configured for each carrier frequency. A value of the DMTC period (dmtcPeriodicity) indicates a time such as 40 ms, 80 ms, and 160 ms. The DMTC offset (dmtcOffset) is given by the number of subframes smaller than the DMTC period. For example, when the DMTC period is 40 ms, the DMTC offset is indicated by a value of any one of 0 to 39 subframes.

In this case, the terminal device calculates a System Frame Number (SFN) of the discovery signal transmission occasion (DMTCoccasion) by using Expression 1 defined by SFN mod T=FLOOR (dmtcOffset/10).

Further, the terminal device respectively calculates subframe numbers by using Expression 2 defined by subframe=dmtcOffset mod 10. In Expression 2 above, a value T is defined by Expression 3 below.

$T=$dmtcPeriodicity$/10$

When the terminal device supports the discovery signal measurement based on the CRS, the terminal device applies the DMTC to measurement of each secondary cell in a deactivated state according to the discovery signal measurement configuration (measDS-Config). Further, the terminal device applies the DMTC to measurement of a neighboring cell with a frequency of each secondary cell in a deactivated state according to the discovery signal measurement configuration (measDS-Config). Note that the DMTC may be applied desirably when the discovery signal measurement configuration (measDS-Config) is configured in a measurement object (measObject) corresponding to the frequency of the secondary cell.

In the case where the discovery signal measurement configuration (measDS-config) is configured for an associated measurement object (measObject), when the terminal device supports measurement of the discovery signal measurement based on the CSI-RS and an event (an event C1 (eventC1) or an eventC2 (eventC2)) related to a CSI-RS report is configured for an event identifier (eventId) of an associated configuration report (reportConfig), the terminal device applies the DMTC to measurement of a CSI-RS resource on a frequency indicated by the associated measurement object (measObject) according to the discovery signal measurement configuration (measDS-Config). Note that the DMTC may be desirably applied according to the discovery signal measurement configuration (measDS-Config) of the associated measurement object (measObject).

Further, in the case where the discovery signal measurement configuration (measDS-config) is configured for the associated measurement object (measObject), when the terminal device supports the measurement of the discovery signal measurement based on the CSI-RS and measurement parameters (e.g., reportStrongestCSI-RSs) related to a neighbor report of the CSI-RS report are included in an associated report configuration (reportConfig), the terminal device applies the DMTC to measurement corresponding to the CSI-RS resource on a frequency indicated by the measurement object (measObject) according to the discovery signal measurement configuration (measDS-Config).

The report configuration includes a report configuration EUTRA (reportConfigEUTRA) correlated with the report configuration identifier (reportConfigId), and the like. Note that hereinafter, the report configuration EUTRA will be simply referred to as a report configuration, in some cases.

The report configuration identifier (reportConfigId) is an identifier used to identify a report configuration related to measurement. The report configuration EUTRA (reportConfigEUTRA), which is a report configuration for the EUTRA, configures (predetermines) triggering criteria of a measurement event which is reported with a measurement report message in the EUTRA.

The report configuration EUTRA (reportConfigEUTRA) can include an event identifier (eventId), a trigger quantity (triggerQuantity), hysteresis, a trigger time (timeToTrigger), a report quantity (reportQuantity), number of maximum report cells (maxReportCells), a report interval (reportInterval), a report amount (reportAmount) and the like.

Next, the report configuration EUTRA (reportConfigEUTRA) will be described. The event identifier (eventId) is information for selecting criteria related to event triggered reporting. The event triggered reporting indicates that reception quality (a measurement result) of a cell is reported to the base station device when the measurement result continuously satisfies the triggering criteria of the measurement event for the trigger time, which will be described later. A method, in which the measurement result is reported by a prescribed number of times at a constant interval when the measurement result continuously satisfies the triggering criteria of the measurement event for the trigger time is called trigger periodic reporting (event triggered periodic reporting).

When it is determined that the triggering criteria is continuously satisfied for the trigger time in a measurement event, the terminal device may determine that a measurement report is triggered (a measurement report procedure is triggered). In the measurement report procedure, the terminal device starts a transmission procedure of a measurement report message and transmits the measurement report message including the measurement result to the base station device. The trigger quantity (triggerQuantity) indicates a quantity used to assess the triggering criteria of the measurement event, and Reference Signal Received Power (RSRP) or Reference Signal Received Quality (RSRQ) is designated. That is, the terminal device uses a quantity designated by the trigger quantity (triggerQuantity) as the measurement result of the downlink reference signal (CRS or CSI-RS), and determines whether the triggering criteria of the measurement event designated by the event identifier (eventId) are satisfied.

As the triggering criteria of the measurement event, for example, an event A1 to an event A6 below are used for an EUTRA cell, and respectively include an entering condition and a leaving condition. When it is determined that the entering condition for a measurement event designated from the base station device is continuously satisfied for the trigger time, the terminal device determines that the measurement report is triggered (the measurement report procedure is triggered) and starts the transmission procedure of the measurement report message in the measurement report procedure. On the other hand, when it is determined that the leaving condition of the measurement event satisfying the entering condition is continuously satisfied for the trigger time, the terminal device stops the transmission procedure of the associated measurement report message.

When a report on leave (reportOnLeave) is configured for the measurement event, the terminal device determines that the measurement report is triggered (the measurement report procedure is triggered) when the entering condition for the measurement event designated from the base station device is satisfied and the leaving condition is satisfied, Event A1
  Event A1 entering condition: Ms−Hys>a1_Threshold
  Event A1 leaving condition: Ms+Hys<a1_Threshold
Event A2
  Event A2 entering condition: Ms−Hys<a2_Threshold
  Event A2 leaving condition: Ms+Hys>a2_Threshold
Event A3
  Event A3 entering condition: Mn+Ofn+Ocn−Hys>Mp+Ofp+Ocp+a3_Offset
  Event A3 leaving condition: Mn+Ofn+Ocn+Hys<Mp+Ofp+Ocp+a3_Offset
Event A4
  Event A4 entering condition: Mn+Ofn+Ocn−Hys>a4_Threshold
  Event A4 leaving condition: Mn−Ofn+Ocn+Hys<a4_Threshold
Event A5
  Event A5 entering condition 1: Mp−Hys<a5_Threshold 1
  Event A5 entering condition 2: Mn+Ofn+Ocn−Hys>a5_Threshold 2
  Event A5 leaving condition 1: Mp+Hys>a5_Threshold 1
  Event A5 leaving condition 2: Mn+Ofn+Ocn+Hys<a5_Threshold 2
Event A6
  Event A6 entering condition: Mn+Ocn−Hys>Ms+Ocs+a6_Offset
  Event A6 leaving condition: Mn+Ocn+Hys<Ms+Ocs+a6_Offset.

In the above, Ms is a measurement result for the serving cell (the primary cell or the secondary cell). Mp is a measurement result for the primary cell. Mn is a measurement result for the neighbour cell. The terminal device assesses each event by using the measurement result Ms of the serving cell, the measurement result Mp of the primary cell, or the measurement result Mn of the neighbour cell.

Hys is a hysteresis parameter for a measurement event to be measured. Ofn is a frequency-specific measurement offset value for a frequency of the neighbour cell. Ocn is a cell-specific offset value for the neighbour cell. When the Ocn is not configured, the terminal device sets the offset value to 0 (zero).

Ofs is a frequency-specific offset value for a frequency of the serving cell. Ocs is a cell-specific measurement offset value for the serving cell.

Ofp is a frequency-specific offset value for a frequency of the primary cell. Ocp is a cell-specific offset value for the primary cell.

a1_Threshold is a threshold parameter to be applied to the event A1. a2_Threshold is a threshold parameter to be applied to the event A2. a3_Offset is an offset parameter to be applied to the event A3. a4_Threshold is a threshold parameter to be applied to the event A4. a5_Threshold 1 and a5_Threshold 2 are threshold parameters to be respectively applied to the event A5. a6_Offset is an offset parameter to be applied to the event A6.

Similarly, as the triggering criteria of the measurement event, an event C1 and an event C2 are used for the CSI-RS resource, and include an entering condition and a leaving condition, respectively. When it is determined that the entering condition for a measurement event designated from the base station device is continuously satisfied for the trigger time, the terminal device determines that the measurement report is triggered (the measurement report procedure is triggered) and starts the transmission procedure of the measurement report message. On the other hand, when the leaving condition of the measurement event satisfying the entering condition is continuously satisfied for the trigger time, the terminal device stops the transmission procedure of the associated measurement report message.

Event C1

Event C1 entering condition: Mcr+Ocr−Hys>c1_Threshold

Event C1 leaving condition: Mcr+Ocr+Hys<c1_Threshold

Event C2

Event C2 entering condition: Mcr+Ocr−Hys>Mref+Oref+c2_Offset

Event C2 leaving condition: Mcr+Ocr+Hys<Mref+Oref+c2_Offset

In the above, Mcr is the measurement result of a CSI-RS resource (i.e., the measurement result of the CSI-RS received with a designated CSI-RS resource). Mref is the measurement result of a reference CSI-RS resource (the measurement result of the CSI-RS in a CSI-RS resource designated as the reference CSI-RS resource from the base station device).

Hys is a hysteresis parameter for a measurement event to be measured. Ocr is a CSI-RS resource-specific measurement offset value. Oref is a reference CSI-RS resource-specific offset value.

c1_Threshold is a threshold parameter to be applied to the event C1. c2_Offset is a measurement offset value to be applied to the event C2.

Hereinafter, appropriate embodiments of the present invention will be described in detail with reference to the drawings while considering the above matters. In describing the embodiments of the present invention, when a specific description for well-known functions and configurations associated with the embodiments of the present invention is determined to make the scope of the embodiments of the present invention unclear, a detailed description thereof will be omitted.

First Embodiment

A first embodiment of the present invention will be described below.

FIG. 1 is a block diagram illustrating an example of a terminal device 1 according to the first embodiment of the present invention. The present terminal device 1 includes at least a receive antenna unit R01 a receiver 101, a demodulator 102, a decoder 103, a reception data controller 104, a physical layer controller 105, a transmission data controller 106, a coder 107, a modulator 108, a transmitter 109, a transmit antenna unit T01, and a radio resource controller 110. The units of the drawing are each an element that is also expressed by a term such as a section, a circuit, a component, a device, and a unit and performs functions and each procedure of the terminal device 1.

The radio resource controller 110 is a block for performing each function of a Radio Resource Control (RRC) layer that performs state control, measurement control, report control, control of common control information and dedicated control information, connection control, movement control, radio resource control and the like of the terminal device 1. The reception data controller 104 and the transmission data controller 106 are blocks for performing each function of a Medium Access Control (MAC) layer, a Radio Link Control (RLC) layer, and a Packet Data Convergence Protocol (PDCP) layer, which manage a data link layer.

The terminal device 1 may be configured to include multiple reception system blocks (the receiver 101, the demodulator 102, and the decoder 103) in order to support multiple frequencies (frequency hands and frequency bandwidths) or simultaneous reception of a cell and multiple transmission system blocks (the coder 107, the modulator 108, and the transmitter 109) in order to support multiple frequencies (frequency bands and frequency bandwidths) or simultaneous transmission of a cell based on the carrier aggregation and/or the dual connectivity. Further, the terminal device 1 may include the reception data controller 104, the physical layer controller 105, the transmission data controller 106, and the radio resource controller 110 in a plural number.

In relation to a reception process of the terminal device 1, reception data control information is inputted from the radio resource controller 110 to the reception data controller 104, and physical layer control information, which is a control parameter for controlling each block, is inputted to the physical layer controller 105. The physical layer control information includes a parameter configuration that is necessary for radio communication control of the terminal device 1 and that includes reception control information and transmission control information.

The physical layer control information is configured by a dedicated radio connection resource configuration, cell-specific broadcast information, a system parameter and the like transmitted to the terminal device 1 from a base station device 2, and is inputted by the radio resource controller 110 to the physical layer controller 105, when needed. The physical layer controller 105 appropriately inputs reception control information, which is control information about reception, to the receiver 101, the demodulator 102, and the decoder 103.

The reception control information includes information, such as reception frequency band information, a reception timing for a physical channel and a physical signal, a multiplexing method, and a radio resource allocation information, as downlink scheduling information. The reception data control information is downlink control information including secondary cell deactivation timer information, Discontinuous Reception (DRX) control information, multicast data reception information, downlink retransmission control information and the like, and includes control information about each downlink in the MAC layer, the RLC layer, and the PDCP layer.

A reception signal is received by the receive antenna unit R01 and inputted to the receiver 101. The receiver 101 receives a signal from the base station device 2 according to a frequency and a frequency band designated with the reception control information. The receiver 101 may include an RF circuit. The received signal is inputted to the demodulator 102. The demodulator 102 demodulates the signal. The demodulator 102 inputs the demodulated signal to the decoder 103. The decoder 103 decodes the inputted signal and inputs the decoded each data (downlink data and downlink control data) to the reception data controller 104. Further, a MAC control element transmitted from the base station device 2 is decoded in the decoder 103 together with each data, and is inputted to the reception data controller 104.

The reception data controller 104 performs control of the physical layer controller 105, buffering control of the decoded each data, error correction control (HARQ) of retransmitted data, and the like based on the received MAC control element. Each data inputted to the reception data controller 104 is inputted (transmitted) to the radio resource controller 110.

Further, in relation to a transmission process of the terminal device 1, transmission data control information is inputted from the radio resource controller 110 to the transmission data controller 106, and physical layer control information, which is a control parameter for controlling each block, is inputted to the physical layer controller 105. The physical layer controller 105 appropriately inputs transmission control information, which is control information about transmission, to the coder 107, the modulator 108, and the transmitter 109. The transmission control information includes information, such as coding information, modulation information, transmission frequency band information, a transmission timing for a physical channel and a physical signal, a multiplexing method, and a radio resource allocation information, as uplink scheduling information.

The transmission data control information is uplink control information including Discontinuous Transmission (DTX) control information, random access configuration information, uplink shared channel information, logical channel priority information, resource request configuration information, cell group information, uplink retransmission control information and the like. The radio resource controller 110 may configure multiple types of random access configuration information, which respectively correspond to multiple cells, for the transmission data controller 106. Further, the radio resource controller 110 manages transmission timing adjustment information and a transmission timing timer to be used to adjust an uplink retransmission timing, and manages a state (a transmission timing adjustment state or a transmission timing non-adjustment state) of the uplink retransmission timing for each cell (or for each cell group or for each TA group). The transmission timing adjustment information and the transmission timing timer are included in the transmission data control information.

When it is necessary to manage multiple uplink transmission timing states, the transmission data controller 106 manages transmission timing adjustment information associated with uplink transmission timings of multiple cells (or cell groups or TA groups). The resource request configuration information includes at least maximum transmission counter configuration information and radio resource request prohibition timer information. The radio resource controller 110 may configure multiple types of resource request configuration information, which respectively correspond to multiple cells, for the transmission data controller 106.

Transmission data (uplink data and uplink control data) generated in the terminal device 1 is inputted to the transmission data controller 106 by the radio resource controller 110 at any timing. In this case, the transmission data controller 106 calculates an amount (an uplink buffer amount) of the inputted transmission data. Further, the transmission data controller 106 has a function of determining whether the inputted transmission data is data belonging to a control plane or data belonging to a user plane.

Further, when the transmission data is inputted, the transmission data controller 106 stores the inputted transmission data in an uplink buffer (not illustrated) thereof. Then, the transmission data controller 106 determines whether a radio resource necessary to transmit the inputted transmission data has been allocated to the terminal device 1. On the basis of the radio resource allocation, the transmission data controller 106 selects any one of a radio resource request (a Scheduling Request (SR)) using the Physical UpLink Shared CHannel (PUSCH) or the Physical UpLink Control CHannel (PUSCH) and a radio resource request using the physical random access channel, and requests the physical layer controller 105 to perform a control process for transmitting the selected channel.

That is, when the radio resource has already been allocated and transmission data can be transmitted through the Physical Downlink Shared CHannel (PUSCH), the coder 107 acquires the transmission data corresponding to the allocated radio resource from the uplink buffer according to an instruction of the radio resource controller 110, codes the transmission data, and inputs the coded data to the modulator 108. Further, when no radio resource has been allocated and a radio resource request is possible through the physical uplink control channel, the coder 107 codes control data necessary to transmit the radio resource request through the physical uplink control channel according to an instruction of the radio resource controller 110, and inputs the coded data to the modulator 108.

Further, when no radio resource has been allocated and no radio resource request is possible through the physical uplink control channel, the coder 107 instructs the transmission data controller 106 to start a random access procedure. In this case, the coder 107 generates a preamble sequence to be transmitted through the physical random access channel based on the random access configuration information inputted from the transmission data controller 106. Further, the coder 107 appropriately codes each data according to the transmission control information, and inputs the coded data to the modulator 108.

The modulator 108 performs an appropriate modulation process based on a channel structure in which the coded each data is transmitted. The transmitter 109 maps each data subjected to the modulation process to a frequency domain, converts a signal of the frequency domain into a signal of a time domain, sends the converted signal on a carrier with a prescribed frequency, and performs power amplification. The transmitter 109 adjusts an uplink transmission timing according to transmission timing adjustment information of each cell (of each cell group or each TA group) inputted by the radio resource controller 110. The transmitter 109 may include an RF circuit. The transmission signal outputted from the transmitter 109 is transmitted from the transmit antenna unit T01. The physical uplink shared channel, in which uplink control data is allocated, may also include the layer 3 message (the Radio Resource Control message: RRC message) for example, in addition to the user data.

In FIG. 1, other elements of the terminal device 1 and a transmission path of data (control information) among the elements are omitted; however, it is apparent that the terminal device 1 has, as elements, multiple blocks having other functions necessary to operate as the terminal device 1. For example, a NAS layer unit for performing control with a core network or an application layer unit exists in the higher order of the radio resource controller 110.

Further, the receive antenna unit R01 or the transmit antenna unit T01 is typically a planar multiband antenna; however, any antenna suited for the capability, the shape, the purpose and the like of the terminal device 1 may be employed. For example, multiple antenna units may be provided and may have directivity, or the receive antenna unit R01 and the transmit antenna unit T01 may be integrally formed with each other. The receive antenna unit R01 and the transmit antenna unit T01 may have multiple antenna ports physically different from one another or logically separated from one another.

Figure 2:
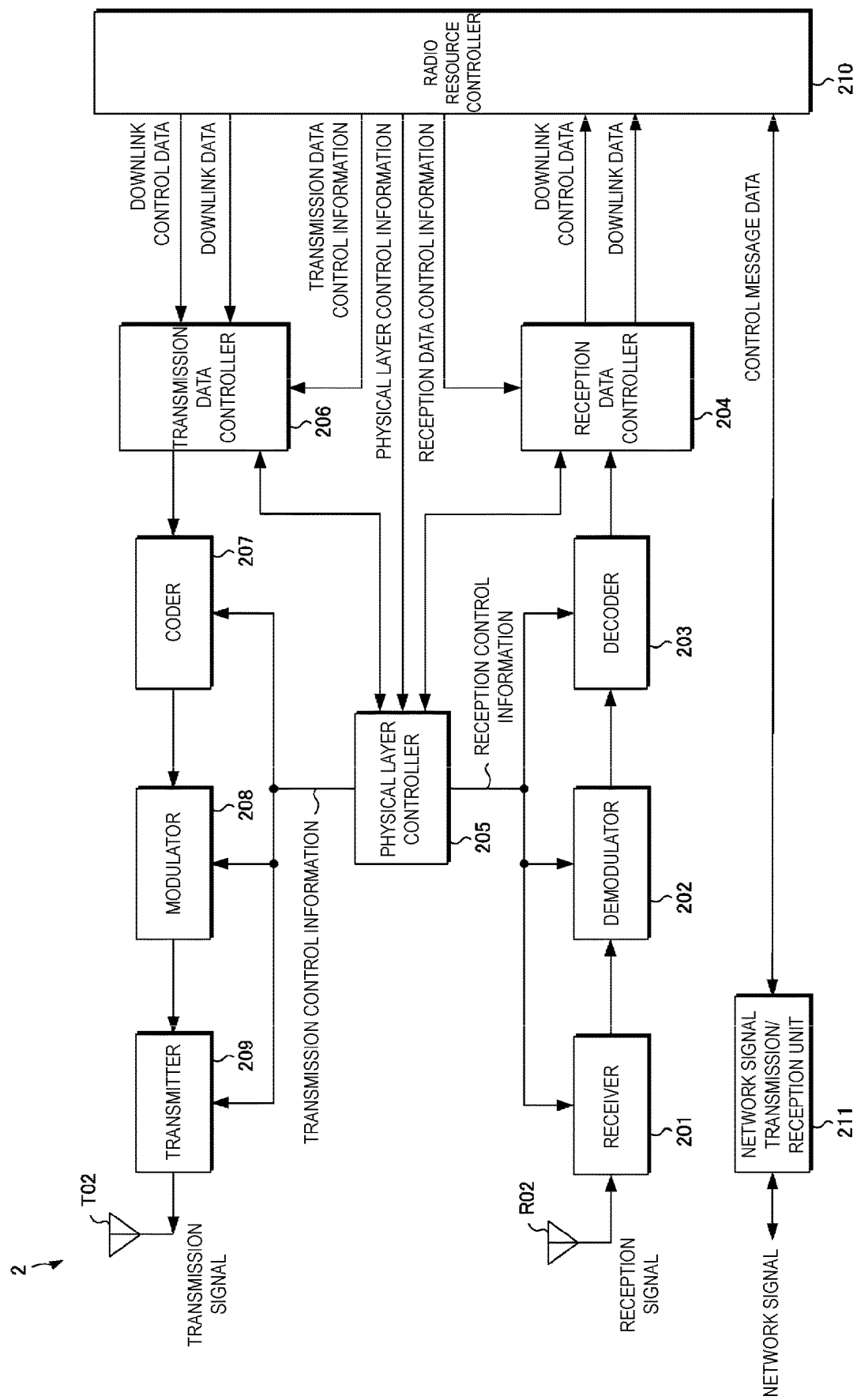
FIG. 2 is a block diagram illustrating an example of a schematic configuration of a base station device according to an embodiment of the present invention.

FIG. 2 is a block diagram illustrating an example of the base station device 2 according to the first embodiment of the present invention. The present base station device includes at least a receive antenna unit R02, a receiver 201, a demodulator 202, a decoder 203, a reception data controller 204, a physical layer controller 205, a transmission data controller 206, a coder 207, a modulator 208, a transmitter 209, a transmit antenna unit T02, a radio resource controller 210, and a network signal transmission and/or reception unit 211. The part of the drawing is an element which is also expressed by a term such as a section, a circuit, a component, a device, and a unit and performs functions and each procedure of the base station device 2.

The radio resource controller 210 is a block for performing each function of a Radio Resource Control (RRC) layer that performs radio resource control of the base station device 2. The reception data controller 204 and the transmission data controller 206 are blocks for performing each function of a Medium Access Control (MAC) layer, a Radio Link Control (RLC) layer, and a Packet Data Convergence Protocol (PDCP) layer, which manage a data link layer.

The base station device 2 may include multiple reception system blocks (the receiver 201, the demodulator 202, and the decoder 203) and multiple transmission system blocks (the coder 207, the modulator 208, and the transmitter 209) to support multiple frequencies (frequency bands and frequency bandwidths) based on the carrier aggregation and/or the dual connectivity. Further, the base station device 2 may include the reception data controller 204, the physical layer controller 205, the transmission data controller 206, the radio resource controller 210, and the network signal transmission and/or reception unit 211 in a plural number.

The radio resource controller 210 inputs downlink data and downlink control data to the transmission data controller 206. When there is a MAC control element to be transmitted to the terminal device 1, the transmission data controller 206 inputs the MAC control element and each data (the downlink data or the downlink control data) to the coder 207. The coder 207 codes the inputted MAC control element and each data and inputs the coded signal to the modulator 208. The modulator 208 modulates the coded signal.

Further, the signal modulated by the modulator 208 is inputted to the transmitter 209. The transmitter 209 maps the inputted signal to a frequency domain, converts a signal of the frequency domain into a signal of a time domain, sends the converted signal on a carrier with a prescribed frequency, and performs power amplification. The transmitter 209 may include an RF circuit. The transmission signal outputted from the transmitter 209 is transmitted from the transmit antenna unit T02. The physical downlink shared channel, in which downlink control data is allocated, typically constitutes the layer 3 message (the RRC message).

Further, a reception signal is received by the receive antenna unit R02 and is inputted to the receiver 201. The receiver 201 converts the signal received from the terminal device 1 into a digital signal of a baseband. When cells having multiple different transmission timings are configured for the terminal device 1, the receiver 201 receives a signal at timings differing in each cell (or each cell group or each TA group). The digital signal converted in the receiver 201 is inputted to and demodulated by the demodulator 202.

The signal demodulated in the demodulator 202 is subsequently inputted to the decoder 203. The decoder 203 decodes the inputted signal and inputs the decoded each data (uplink data and uplink control data) to the reception data controller 204. Further, the MAC control element transmitted from the terminal device 1 is decoded by the decoder 203 together with each data, and is inputted to the reception data controller 204.

The reception data controller 204 performs control of the physical layer controller 205, buffering of the decoded each data, and error correction control (HARQ) of retransmitted data based on the received MAC control element. Each data inputted to the reception data controller 204 is inputted (transmitted) to the radio resource controller 210.

The physical layer control information necessary to control these blocks is information including a parameter configuration constituted of the reception control information and the transmission control information and necessary for the radio communication control of the base station device 2. The physical layer control information is configured by an upper network apparatus (a MME, a gateway apparatus (SGW), an OAM and the like) or a system parameter, and is inputted to the reception data controller 204 by the radio resource controller 210 as necessary.

The physical layer controller 205 inputs physical layer control information about transmission to each block of the coder 207, the modulator 208, and the transmitter 209 as the transmission control information, and appropriately inputs physical layer control information about reception to each block of the receiver 201, the demodulator 202, and the decoder 203 as the reception control information.

The reception data control information includes control information about the uplink of the terminal device 1 with respect to each of the MAC layer, the RLC layer, and the PDCP layer of the base station device 2. Further, the transmission data control information includes control information about the downlink of the terminal device 1 with respect to each of the MAC layer, the RLC layer, and the PDCP layer of the base station device 2. That is, the reception data control information and the transmission data control information are configured for each terminal device 1.

The network signal transmission and/or reception unit 211 performs transmission or reception of a control message or user data between the base station devices 2 or between the upper network apparatus (the MME and the SGW) and the base station device 2. In FIG. 2, other elements of the base station device 2 and a transmission path of data (control information) among the elements are omitted; however, it is apparent that the base station device 2 has, as elements, multiple blocks having other functions necessary to operate as the base station device 2. For example, a radio resource management unit or an application layer unit exists in the higher order of the radio resource controller 210.

Further, the receive antenna unit R02 or the transmit antenna unit T02 is typically a planar multiband antenna; however, it may be possible to employ any antenna suited for the transmission capability, the shape, the purpose and the like of the base station device 2. For example, multiple antenna units may be provided and may have directivity, or the receive antenna unit R02 and the transmit antenna unit T02 may be integrally formed with each other. Moreover, the receive antenna unit R02 and the transmit antenna unit T02 (may also include the receiver 201 and the transmitter 209) may be formed as one unit (remote radio head: RRH) independent of the base station device 2, and may be arranged at a position different from that of the base station device 2.

Figure 3:
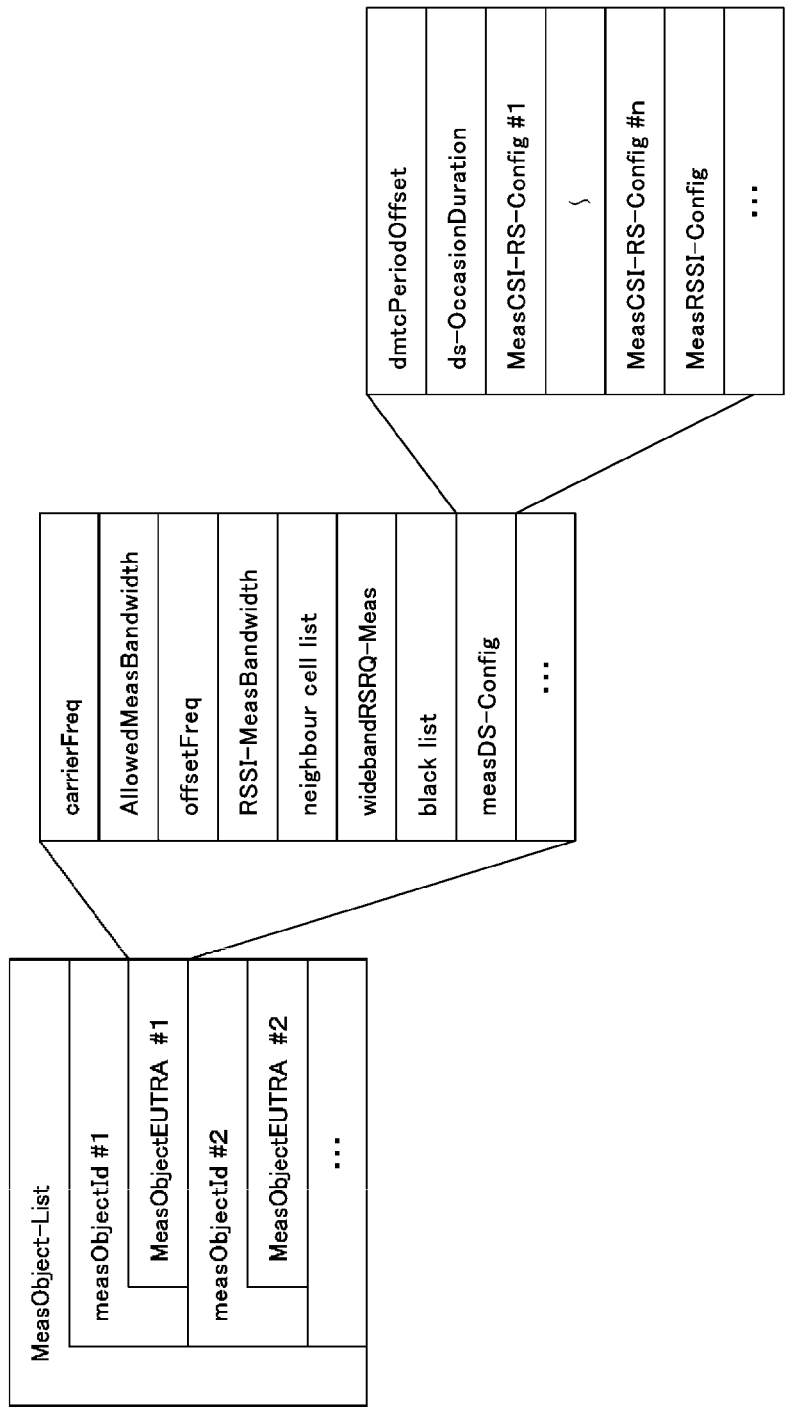
FIG. 3 is a diagram illustrating an example of parameters for a measurement object according to an embodiment of the present invention.

FIG. 3 is a diagram illustrating parameters (information elements), which are included in a measurement configuration notified to (configured for) the terminal device 1 from the base station device 2, and which relate to measurement object(s).

The base station device 2 includes one or more measurement objects into a list (MeasObject-List) to notify the list. For the respective measurement objects, one associated measurement object identifier is configured. In the example of FIG. 3, two measurement object EUTRAs (MeasObjectEUTRA #1 and MeasObjectEUTRA #2) are configured and different measurement object identifiers (meaObjId #1 and meaObjId #2) are configured for the respective measurement object EUTRAs. The base station device 2 notifies the terminal device 1 of a measurement object to be added, deleted, or changed by using the measurement object identifier. In FIG. 3, the measurement object included in the list is not limited to the measurement object EUTRA, and may include a measurement object (e.g., a measurement object UTRA (measObjectUTRA)) corresponding to another radio access technology and a measurement object GERAN (measObjectGERAN).

The measurement object EUTRA can further include a carrier frequency (carrierFreq), an RSSI measurement bandwidth (RSSI-MeasBandwidth), an allowed measurement bandwidth (AllowMeasBandwidth), an offset frequency (offsetFreq), information about a neighbour cell list, information about a black list, wideband RSRQ measurement (widebandRSRQ-Meas), a discovery signal measurement configuration (measDS-Config) and the like.

The carrier frequency (carrierFreq) is a parameter for uniquely indicating a frequency band and a frequency, and specifically one integral value to be used for a variable of a predetermined calculation formula is notified. For example, when indicating an EUTRA band, any one value of 0 to 65535 is configured. When an unlicensed band is designated as the carrier frequency (carrierFreq), a value of a range different from that of the related art may be newly configured or a different calculation formula may be used.

The RSSI measurement bandwidth is a new parameter related to the RSSI measurement and represents a maximum allowable measurement bandwidth, which is applied when performing the RSSI measurement, by the number of resource blocks. Note that a newly added parameter may be desirably configured in an additional field (an enhanced field) of the RRC message. The base station device 2, for example, designates (indicates) the number of resource blocks, which is any one of 6, 15, 25, 50, 75, and 100, as the RSSI measurement bandwidth to the terminal device 1. The terminal device 1 may use the designated number of resource blocks as the maximum allowed measurement bandwidth when the RSSI measurement is performed in the measurement object EUTRA associated with the RSSI measurement bandwidth. In other words, in the case of performing the RSSI measurement of a frequency related to the measurement object EUTRA including the RSSI measurement bandwidth, the terminal device 1 may perform the RSSI measurement by employing the number of resource blocks designated with the RSSI measurement bandwidth as an upper limit of the measurement bandwidth.

Alternatively, the RSSI measurement bandwidth is obtained by indicating a minimum requested measurement bandwidth, which is applied when performing the RSSI measurement, by the number of resource blocks. The terminal device 1 may employ the designated number of resource blocks as the minimum requested measurement bandwidth when the RSSI measurement is performed in the measurement object EUTRA associated with the RSSI measurement bandwidth. In other words, in the case of performing the RSSI measurement of a frequency related to the measurement object EUTRA including the RSSI measurement bandwidth, the terminal device 1 may perform the RSSI measurement by employing the number of resource blocks designated with the RSSI measurement bandwidth as a lower limit of the measurement bandwidth.

When the wideband RSRQ measurement (widebandRSRQ-Meas) related to RSRQ measurement is indicated as TRUE, the terminal device 1 may apply a measurement bandwidth (i.e., a measurement bandwidth of 6 resource blocks or more which is applied to the RSRQ measurement, as a measurement bandwidth for performing the RSSI measurement.

The discovery signal measurement configuration (measDS-Config) can further include information (DMTC period offset (dmtcPeriodOffset) indicating a period and a time offset of a discovery signal transmission occasion (DMTCoccasion), information (a discovery signal duration (ds-OccasionDuration)) indicating a length of the discovery signal transmission occasion, a CSI-RS resource measurement configuration (MeasCSI-RS-Config), and the like. The discovery signal measurement configuration can include multiple CSI-RS resource measurement configurations (MeasCSI-RS-Config #1 to MeasCSI-RS-Config # n). In this case, the base station device may include an identifier (a measurement CSI-RS resource identifier (MeasCSI-RS-Id)) for identifying the multiple CSI-RS resource measurement configurations.

Further, the discovery signal measurement configuration may include a measurement RSSI configuration (MeasRSSI-Config). Such an RSSI measurement bandwidth may be included in the measurement RSSI configuration. Note that any other parameters may be included in the discovery signal measurement configuration. The discovery signal measurement configuration (measDS-Config) may be a second discovery signal measurement configuration (measDS-Config2) corresponding to a different discovery signal for an unlicensed band.

Figure 4:
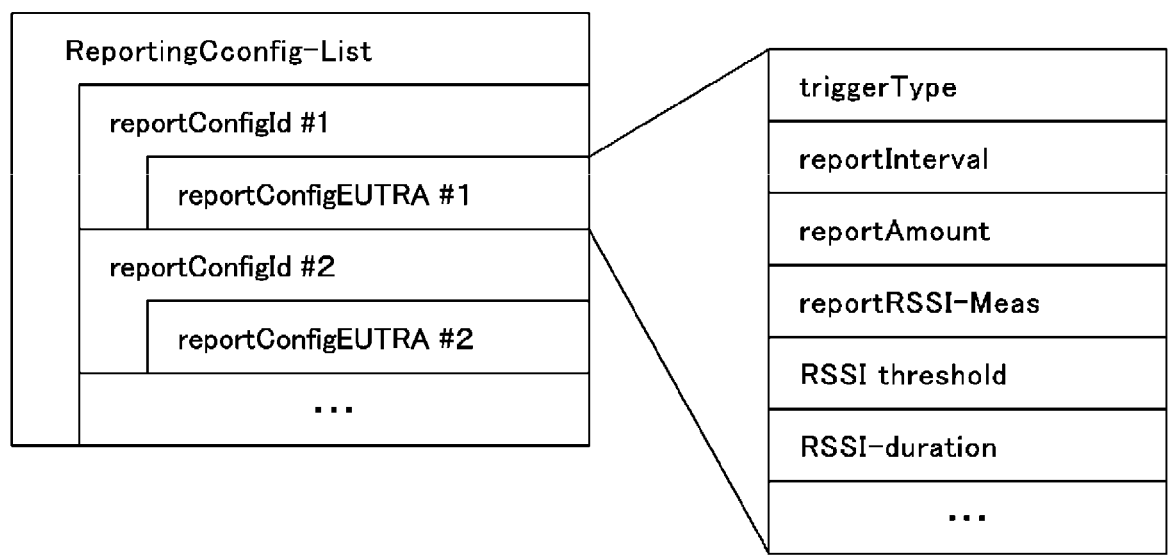
FIG. 4 is a diagram illustrating an example of parameters for a report configuration according to an embodiment of the present invention.

FIG. 4 is a diagram illustrating parameters (information elements) which are included in a measurement configuration notified to (configured for) the terminal device 1 from the base station device 2, and which relates to reporting configuration(s).

The base station device 2 includes one or more reporting configurations into a list (ReportingCconfig-List) to notify the list. For the respective reporting configurations, one associated report configuration identifier (reportConfigId) is configured. In the example of FIG. 4, two report configuration EUTRAs (reportConfigEUTRA #1 and reportConfigEUTRA #2) are configured and different report configuration identifiers (reportConfigId #1 and reportConfig #2) are configured for the respective report configuration EUTRAs. The base station device 2 notifies the terminal device 1 of a report configuration to be added, deleted, or changed by using the report configuration identifier. In FIG. 4, the report configuration included in the list is not limited to the report configuration EUTRA, and may include a report configuration (e.g., a report configuration Inter-RAT (reportConfigInterRAT)) corresponding to another radio access technology.

The report configuration EUTRA can further include a trigger type (triggerType), a report interval (reportInterval), a report amount (reportAmount), report RSSI measurement (reportRSSI-meas), multiple RSSI threshold values (RSSI threshold), a measurement RSSI duration (RSSI-duration), and the like. Note that other parameters may be included in the report configuration EUTRA. For example, in a case where the trigger type (triggerType) is an event, parameters (the aforementioned hysteresis parameter Hys and the like) corresponding to each event may be included.

The trigger type (triggerType) indicates whether a trigger of a report defined in the report configuration EUTRA is an event report type (event) or a periodical report type (periodical). The event report type is performed in a measurement report procedure when the triggering criteria defined in the event A1 to A6, the event C1 and C2, or the like are satisfied. On the other hand, in the periodical report type, a measurement result is periodically reported when a measurement time is passed. The report interval (reportInterval) and the report amount (reportAmount) are parameters used for a report of periodical report type.

A time indicated by the report interval is applied to respective measurement identifiers as a periodical reporting timer. The terminal device 1 increments the number of times of report transmission (numberOfReportsSent) which is an internal variable when the periodical reporting timer expires. The terminal device 1 starts the periodical reporting timer when the number of times of report transmission is smaller than the number of reports, and removes an associated measurement identifier when the number of times of report transmission is equal to or more than the number of reports. When the periodical reporting timer expires, the terminal device 1 determines that a measurement report is triggered (a measurement report procedure is triggered).

The report RSSI measurement (reportRSSI-meas) is a parameter indicating whether the RSSI of a frequency of an associated measurement object is periodically reported. In other words, in the terminal device 1, the report RSSI measurement is a parameter indicating whether to perform a periodical RSSI measurement report. The base station device 2 may configure the report RSSI measurement only when the discovery signal measurement configuration (measDS-Config) is included in the associated measurement object. When it is designated with a true value, the base station device 2 may configure (notify) a value of the report RSSI measurement to a true value (TRUE) only when the discovery signal measurement configuration (measDS-Config) is included in the associated measurement object (a measurement object of a measurement object identifier linked to a report configuration identifier).

The base station device 2 may always designate the trigger type when configuring the report RSSI measurement to the periodical report type. The base station device 2 may always designate the report amount when configuring the report RSSI measurement to once. When a measurement report is triggered, in a case where a reportable RSSI result (rssiResults) is held, the terminal device 1 may put the RSSI result into a measurement report message as a measurement result and report the measurement result. Further, when a periodical report type or an event report type measurement report related to RSSI is triggered, in a case where a reportable RSSI result is held, the terminal device 1 may put the RSSI result into a measurement report message as a measurement result and report the measurement result. In this case, when the RSSI result is initially reportable, the terminal device 1 may configure the value of the number of times of report transmission (numberOfReportsSent), which is an internal variable, to 0 (zero).

The RSSI threshold value (RSSI threshold), for example, is a parameter necessary for an RSSI report for a hidden terminal problem. The RSSI threshold value may be an explicit value (e.g., dBm), a value of an index to be mapped to a predefined threshold value, or a value obtained by designating a value of a variable to be introduced to a calculation formula for calculating a threshold value. The RSSI threshold value may be configured in a plural number. The terminal device 1 compares the measured RSSI and the threshold value with each other.

For example, when a threshold value 1 and a threshold value 2 (the threshold value 1<the threshold value 2) are notified from the base station device 2, the terminal device 1 may count the number of times by which the RSSI becomes less than the threshold value 1, the number of times by which the RSSI exceeds the threshold value 1 and becomes less than the threshold value 2, and the number of times by which the RSSI exceeds the threshold value 2, respectively. Further, the terminal device 1 may indicate a time for which the RSSI becomes less than the threshold value 1, a time for which the RSSI exceeds the threshold value 1 and becomes less than the threshold value 2, and a time for which the RSSI exceeds the threshold value 2 by using a ratio (percentage), respectively.

The measurement RSSI duration (RSSI-duration), for example, is a different parameter necessary for the RSSI report for the hidden terminal problem, and indicates a duration length by which the RSSI measurement is performed. The duration length may indicate a continuous time or may be obtained by summing up discontinuous times. The measurement RSSI duration may be an explicit value such as a frame, a subframe, and ms (millisecond), may be obtained by designating the number of times of the discovery signal transmission occasion (DMTC Occasion), may be a numerical value indicating the number of times of the RSSI measurement, may be obtained by indicating a subset duration in the discovery signal transmission occasion (DMTC Occasion), or may be obtained by indicating a subframe, in which the RSSI measurement is performed, in a bitmap format. The measurement RSSI duration may be designated as an RRC timer. When the measurement identifier and the report configuration are correlated with each other, the terminal device 1 may start the RRC timer indicating the measurement RSSI duration. The RRC timer, for example, a timer T322.

That is, in the case where the measurement identifiers are added (changed), when a trigger type of an associate report configuration is a periodical report type with respect to the respective measurement identifiers and the report RSSI measurement is included in the associate report configuration, the terminal device 1 may start the RRC timer indicated by the measurement RSSI duration.

The RSSI threshold value (RSSI threshold) and the report RSSI measurement (reportRSSI-Meas) may be notified (configured) as parameter sets to be listed to the report configuration. For example, the base station device 2 may notify (configure) a measurement RSSI identifier (reportRSSI-Id) associated with each parameter set, thus adding, changing, and deleting the parameter sets (including the RSSI threshold value and the report RSSI measurement) with respect to the terminal device 1.

When a correspondence relation of holding measurement identifiers is changed or when the holding measurement identifiers are removed, the terminal device 1 may stop the running RRC timer. The change in the correspondence relation, for example, indicates that different measurement configuration identifiers or different report identifiers are configured for (i.e., replaced with) the same measurement identifier.

In the measurement RSSI duration, an explicit measurement start timing a system frame and/or a subframe serving as measurement start) may be designated. Alternatively, a predefined value may be configured as the RRC timer without explicitly stating the measurement RSSI duration.

When the measurement identifier and the report configuration are correlated with each other, the terminal device 1 may start the RRC timer. Further, the measurement RSSI duration may be notified with system information. Further, multiple predefined values may be switched based on the RRC parameters or a predetermined value may be configured based on the associated measurement object.

An RSSI measurement method using the parameters illustrated in FIG. 3 and FIG. 4 will be described below. The measurement object in FIG. 3 and the report configuration in FIG. 4 are correlated in a one-to-one manner by the measurement identifier (measId). In other words, the base station device 2 notifies the terminal device 1 of one measurement identifier measId in order to correlate one measurement object identifier (measObjectId) in FIG. 3 with one report identifier (reportConfigId) in FIG. 4 (configures one measurement identifier (measId) for the terminal device 1). The base station device 2 may configure the measurement identifier such that multiple different report identifiers (reportConfigId) are linked to one measurement object identifier (measObjectId). Similarly, the base station device 2 may configure the measurement identifier such that multiple different measurement object identifiers (measObjectId) are linked to one report identifier (reportConfigId).

The terminal device 1 is in at least an RRC connected state (RRC-CONNECTED and a communication state), and one or more unlicensed band frequencies are configured as the measurement object (measObject). The base station device 2 may add a primary cell to the terminal device 1, thus configuring a secondary cell (a LAA cell) having one or more unlicensed band frequencies. In other words, the terminal device 1 measures the unlicensed band frequency as a serving frequency (an intra-frequency) or a non-serving frequency (an inter-frequency).

When the discovery signal measurement configuration (measDS-Config) is configured for the associated measurement object and information (measurement parameters) on the RSSI measurement is included in the associated measurement object with respect to the respective measurement identifiers (measId), the terminal device 1 may perform the RSSI measurement. Further, when the discovery signal measurement configuration (measDS-Config) is configured for the associated measurement object and the information (the measurement parameters) on the RSSI measurement is included in the associated report configuration (or when a measurement event is configured) with respect to the respective measurement identifiers (measId), the terminal device 1 may perform the RSSI measurement by applying the discovery signal measurement timing configuration to the frequency of the associated measurement object.

When the associated measurement object is a measurement object EUTRA and the information (the measurement parameters) on the RSSI measurement is included in the associated measurement object with respect to the respective measurement identifiers (measId), the terminal device 1 may determine (decide or estimate) that the frequency of the associated measurement object is a frequency applicable for the RSSI measurement (the RSSI report). That is, the terminal device 1 may determine that the frequency of the associated measurement object is a frequency to be subjected to the RSSI measurement (the RSSI report) or a frequency requiring the RSSI measurement (the RSSI report). For example, when the RSSI measurement bandwidth (RSSI-MeasBandwidth) is configured for the associated measurement object with respect to the respective measurement identifiers(measId), the terminal device 1 may determine that the frequency of the associated measurement object is a frequency (an applicable frequency) applicable for performing the RSSI measurement. The frequency applicable for the RSSI measurement (the RSSI report) may be called a resource (an applicable resource) applicable for the RSSI measurement (the RSSI report).

Further, for example, when the measurement RSSI configuration (measRSSI-Config) is configured for the discovery signal measurement configuration (measDS-Config) of the associated measurement object with respect to the respective measurement identifiers (measId), the terminal device 1 may determine that the frequency of the associated measurement object is the frequency (the applicable frequency) applicable for the RSSI measurement. Further, for example, when a band corresponding to the carrier frequency (carrierFrequency) indicated by the associated measurement object is an unlicensed band with respect to the respective measurement identifiers (measId), the terminal device 1 may determine that the frequency of the associated measurement object is the frequency (the applicable frequency) applicable for the RSSI measurement.

Further, when the associated measurement object is the measurement object EUTRA and the information (the measurement parameters) on the RSSI measurement is included in the associated report configuration with respect to the respective measurement identifiers(measId), the terminal device 1 may determine that the frequency of the measurement object associated with the associated report configuration is the frequency (the applicable frequency) applicable for the RSSI measurement. For example, when the report RSSI measurement (reportRSSI-meas) is configured for the associated report configuration with respect to the respective measurement identifiers (measId), the terminal device 1 may determine that the frequency of the associated measurement object is the frequency (the applicable frequency) applicable for the RSSI measurement. Further, for example, when a measurement event related to the RSSI is configured for the associated report configuration with respect to the respective measurement identifiers (measId), the terminal device 1 may determine that the frequency of the associated measurement object is the frequency (the applicable frequency) applicable for the RSSI measurement.

Further, when the discovery signal measurement configuration (measDS-Config) is configured for the associated measurement object in addition to the above, the terminal device 1 may determine that the frequency of the associated measurement object is the frequency (the applicable frequency) applicable for the RSSI measurement. Note that the frequency applicable for the RSSI measurement may be called a frequency to be subjected to a measurement report (a measurement report trigger), or a frequency to be reported with a measurement report message. Note that the measurement object is not limited to the measurement object EUTRA, and may include a measurement object of the inter-RAT or a measurement object a measurement object LAA) to be added for the LAA.

When the frequency applicable for the RSSI measurement is a frequency of a secondary cell, in a case where an associated secondary cell is in an activation state, the terminal device 1 measures the RSRP and the RSRQ of the CRS without applying the discovery signal measurement timing configuration included in the associated measurement object. In a case where the associated secondary cell is in a deactivation state, the terminal device 1 applies the discovery signal measurement timing configuration included in the associated measurement object and measures the RSRP and the RSRQ of the CRS in the discovery signal duration. When the terminal device 1 supports CRS-based discovery signal measurement and the associated secondary cell is in a deactivation state, the terminal device 1 may apply the discovery signal measurement timing configuration when measuring the RSRP and the RSRQ of the CRS of the secondary cell.

Further, when the terminal device 1 supports the CRS-based discovery signal measurement, the terminal device 1 may apply the discovery signal measurement timing configuration when measuring the RSRP and the RSRQ of the CSI-RS resource. Further, when the frequency applicable for the RSSI measurement is the frequency of the secondary cell, the terminal device 1 may always apply the discovery signal measurement timing configuration included in the associated measurement object and measure the RSSI in the discovery signal duration regardless of the state (the activation state and the deactivation state) of the associated secondary cell.

Further, when the frequency applicable for the RSSI measurement is the non-serving frequency (the inter-frequency), the terminal device 1 may apply the discovery signal measurement timing configuration included in the associated measurement object and measure the RSSI in the discovery signal duration. In addition, when the terminal device 1 supports the CRS-based discovery signal measurement and the associated frequency is the non-serving frequency, the terminal device 1 may apply the discovery signal measurement timing configuration when measuring the RSRP and the RSRQ of the CRS of the neighboring cell.

In the aforementioned procedure, when the discovery signal measurement timing configuration is not included in the associated measurement object, the terminal device 1 may not perform the procedure of applying the discovery signal measurement timing configuration.

The terminal device 1 may measure the RSSI in units of OFDM symbols. The terminal device 1 may measure the RSSI in OFDM symbols including the CRS or only OFDM symbols from which the CRS is detected. The terminal device 1 may measure the RSSI in all OFDM symbols. The terminal device 1 may employ the discovery signal duration (ds-OccastionDuration) as a measurement subframe, average RSSIs measured during the discovery signal duration (ds-OccastionDuration), and employ the averaged RSSI as a measurement result. The terminal device 1 may measure the RSSIs in the whole or a part of the OFDM symbols in the discovery signal duration (ds-OccastionDuration), average the measured RSSIs, and employ the averaged RSSI as a measurement result. The terminal device 1 may periodically measure the RSSIs during the discovery signal duration (ds-OccastionDuration) for each constant time, average the measured RSSIs, and employ the averaged RSSI as a measurement result. That is, the terminal device 1 may divide the discovery signal duration (ds-OccastionDuration) into each constant time (e.g., in units of constant subframes), measure the RSSIs in the whole or a part of the OFDM symbols in the divided times, average the measured RSSIs, and employ the averaged RSSI as a measurement result.

Further, the terminal device 1 may employ the discovery signal transmission occasion (DMTCOccasion) as a measurement subframe, average the RSSIs measured during the discovery signal transmission occasion (DMTCOccasion), and employ the averaged RSSI as a measurement result. The terminal device 1 may measure the RSSIs in the whole or a part of the OFDM symbols during the discovery signal transmission occasion (DMTCOccasion), average the measured RSSIs, and employ the averaged RSSI as a measurement result. Further, the terminal device 1 may periodically measure the RSSIs during the discovery signal transmission occasion (DMTCOccasion) for each constant time, average the measured RSSIs, and employ the averaged RSSI as a measurement result. That is, the terminal device 1 may divide the discovery signal transmission occasion (DMTCOccasion) into each constant time (e.g., in units of constant subframes), measure the RSSIs in the whole or a part of the OFDM symbols in the divided times, average the measured RSSIs, and employ the averaged RSSI as a measurement result.

Further, in the discovery signal duration (ds-OccastionDuration) or the discovery signal transmission occasion (DMTCOccasion), based on information designated from the base station device 2, the terminal device 1 may use only a specific OFDM symbol for the purpose of the RSSI measurement, may use a CRI-RS resource designated by the CRI-RS resource measurement configuration (MeasCRI-RS-Config) for the purpose of the RSSI measurement, or may use only a specific subframe for the purpose of the RSSI measurement. Further, the terminal device 1 may not perform the RSSI measurement at the frequency of the secondary cell in the activation state.

The terminal device 1 sets the RSSI result as a measurement result (measResults) with respect to a measurement identifier associated with a measurement report triggered based on the report configuration, puts the measurement result into a measurement report message, and transmits the measurement report message. More specifically, when there is at least one frequency (applicable frequency) applicable for the RSSI measurement for the purpose of a report with respect to measurement identifiers associated with the triggered measurement report, the terminal device 1 may put an RSSI result of multiple applicable frequencies into the measurement report message until a designated maximum number (maxReportFrequency) is reached. The multiple applicable frequencies may be multiple frequencies associated with the measurement identifiers. In the case of including a measurement result of multiple frequencies, the strongest RSSI is first included (i.e., a descending order). For example, when the trigger type is the periodical report type, an RSSI result of at least one frequency (applicable frequency) applicable for the RSSI measurement is put into a new measurement result available (reportable) after the latest periodical report. The RSSI result (of an applicable frequency) obtained by the RSSI measurement may be reported in a different format based on the report configuration. When the RSSI result is based on a specific configuration, identifiers corresponding to the configuration are simultaneously reported. For example, when the RSSI measurement is based on the CSI-RS resource measurement configuration, the terminal device 1 may put a measurement CSI-RS resource identifier (MeasCSI-RS-Id) into a measurement result together with the RSSI result.

The terminal device 1 may put a value obtained by averaging (layer 3 filtering) the RSSI measurement values into a measurement result as the RSSI result. The RSSI measurement results are averaged, so that it is possible to report an RSSI value obtained by removing an influence due to a temporary change in the RSSI. Further, even when it is not possible to measure the RSRP or the RSRQ because the unlicensed band is in a busy state, the terminal device 1 can measure the RSSI, thus reporting a received strength of a signal in the unlicensed band to the base station device 2.

Further, the terminal device 1 may put a result obtained by comparing the respective RSSI measurement values with the RSSI threshold value (RSSI threshold) into the measurement result, and report the measurement result. For example, the terminal device 1 may compare the measurement results of the measured RSSI with the notified RSSI threshold value (RSSI threshold), aggregate values corresponding to data (frequency) of a histogram or a frequency table, put the aggregation result into the measurement result, and report the measurement result. That is, the RSSI threshold value defines the number of bins (a bin width) in the histogram. In other words, the RSSI threshold value defines the number of levels of the frequency table. For example, when two values are notified as the RSSI threshold value, the number of bins is 3 in the case of the histogram and the number of levels is 3 in the case of the frequency table.

Further, the base station device 2 may explicitly put histogram report RSSI measurement (reportRSSI-Hist-Meas) into a report configuration as a measurement parameter indicating that the measured RSSI is reported in a histogram format (or a frequency distribution format). When the histogram report RSSI measurement is configured (notified) (for example, when a value is configured to TRUE), the RSSI threshold value and the measurement RSSI duration may be constituted to be effective. Alternatively, only when the histogram report RSSI measurement is configured, the RSSI threshold value and the measurement RSSI duration may be constituted to be configured (notified).

When the histogram report RSSI measurement is configured (notified), the terminal device 1 may not perform the layer 3 filtering for the RSSI result which is reported in the histogram format. For example, when the histogram report RSSI measurement is configured (notified), the terminal device 1 may assume the layer 3 filtering coefficient as 0 (zero). That is, the layer 3 filtering coefficient may be ignored. Alternatively, when the histogram report RSSI measurement is configured (notified), the terminal device 1 may not apply the layer 3 filtering coefficient to the RSSI result, to the RSSI result.

The terminal device 1 may perform a normal RSSI report (a first RSSI report), to which the layer 3 filtering is applicable, when a measurement report of the histogram format (the frequency distribution format) is not requested (configured), and perform a report (a second RSSI report) of the histogram format (the frequency distribution format) when the measurement report of the histogram format (the frequency distribution format) is requested (configured). In the case of performing the second RSSI report, the terminal device 1 may put the first RSSI report into the measurement report message in addition to the second RSSI report, and report the measurement report message.

In the case of performing the normal RSSI report (the first RSSI report), when a measure RSSI is reportable at the frequency of the associated measurement object, the terminal device 1 may determine that the measurement report is triggered in the associated measurement identifier. Further, in the case of performing the normal RSSI report (the first RSSI report), when the measurement result of the primary cell is effective and the strongest cell is decided from neighboring cells detected at the frequency of the associated measurement object, the terminal device 1 may determine that the measurement report is triggered in the associated measurement identifier.

Further, in the case of performing the RSSI report (the second RSSI report) of the histogram format, when a time indicated by the measurement RSSI duration is passed at the frequency of the associated measurement object, the terminal device 1 may determine that the measurement report is triggered in the associated measurement identifier. Further, in the case of performing the RSSI report (the second RSSI report) of the histogram format, when the RRC timer indicated by the measurement RSSI duration expires at the frequency of the associated measurement object, the terminal device 1 may determine that the measurement report is triggered in the associated measurement identifier.

Figure 5:
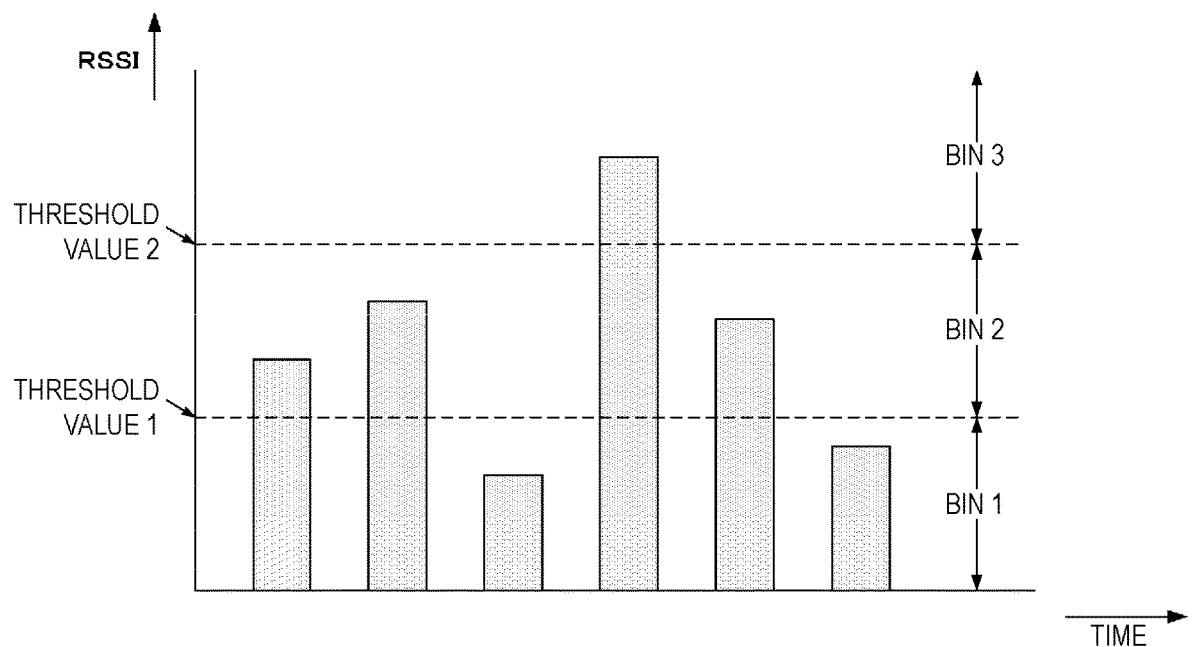
FIG. 5 is a diagram illustrating an example of an RSSI report method according to an embodiment of the present invention.

The report of the histogram format (the frequency distribution format) will be described in more detail. For example, a description will be provided for a case where an RSSI result as illustrated in FIG. 5 is obtained for each measurement and a threshold value 1 and a threshold value 2 are notified. FIG. 5 illustrates a case where the number of RSSI measurement values becoming less than the threshold value 1 is 2, the number of RSSI measurement values equal to or more than the threshold value 1 and becoming less than the threshold value 2 is 3, and the number of RSSI measurement values equal to or more than a threshold value 3 is 1. In this case, when the measurement report of the histogram format (the frequency distribution format) is requested (configured), the terminal device 1 puts an information element (a field) of {bin 1, bin 2, bin 3}={2, 3, 1} into the measurement report message as a measurement result, and transmits the measurement report message to the base station device 2.

When the measurement report of the histogram format (the frequency distribution format) is requested (configured), in a case where an actual measurement time (or the number of times of measurement) does not satisfy the total time (the measurement RSSI duration) for which RSSI measurement is performed, the terminal device 1 may not perform the RSSI report of the histogram format. That is, until the time (or the number of times of measurement) indicated by the measurement RSSI duration is satisfied, the terminal device 1 may assume that there is no frequency (no applicable frequency) applicable for the RSSI measurement or there is no reportable RSSI result.

Further, in the case where the RSSI measurement is performed in the histogram format, when it is not possible to simultaneously measure other frequencies, the terminal device 1 may perform no measurement with respect measurement of other frequencies (inter-frequency measurement). In other words, when the RSSI measurement is performed in the histogram format, the terminal device 1 may apply different measurement requirements in other cases. The terminal device 1 may implicitly mitigate a measurement requirement of a frequency at which the RSSI measurement is needed to be performed in the histogram format, or mitigate a measurement requirement only for a frequency at which a measurement parameter (a reduced measurement requirement (reducedMeasPerformanc)) is configured, the measurement parameter indicating that a measurement requirement can be explicitly mitigated. For example, the terminal device 1 may mitigate (extend) a time of a measurement requirement by a time necessary for performing the RSSI measurement in the histogram format. Alternatively, the terminal device 1 may preferentially measure a frequency at which the RSSI measurement is needed to be performed in the histogram format, and may mitigate measurement requirements of other frequencies.

Figure 6:
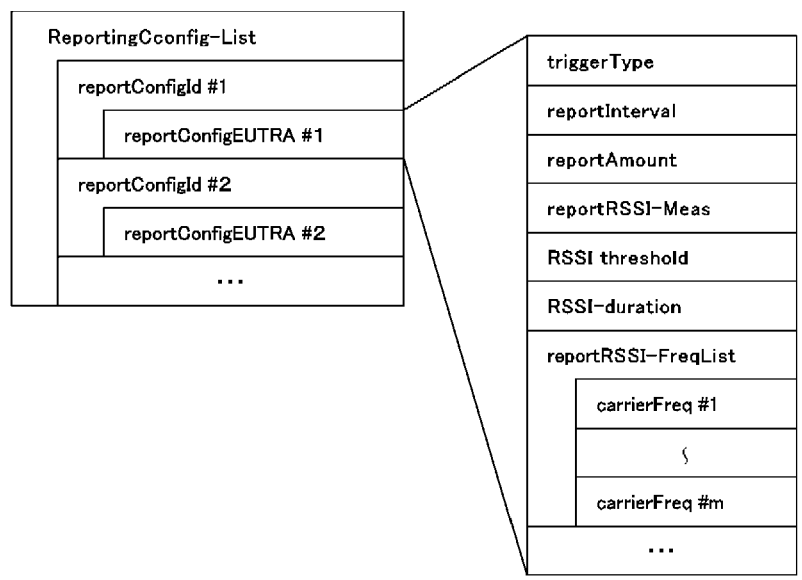
FIG. 6 is a diagram illustrating another example of parameters for a report configuration according to an embodiment of the present invention.

FIG. 6 is another diagram illustrating another example of parameters related to the report configuration according to the embodiment of the present invention. The base station device 2 may put a report RSSI frequency list (reportRSSI-FreqList) into the report configuration, and transmit the report configuration to the terminal device 1 (notify the terminal device 1 of the report configuration).

The report RSSI frequency list (reportRSSI-FreqList) can include one or multiple (1 to m (where m is an integer)) carrier frequencies (carrierFreq). When the measurement object is the measurement object EUTRA and measurement parameters related to the report RSSI frequency list are included in the report configuration, the terminal device 1 may determine that a carrier frequency indicated by the report RSSI frequency list is the frequency (the applicable frequency) applicable for the RSSI measurement. That is, the terminal device 1 may determine that each of the carrier frequencies (carrierFreq) included in the report RSSI frequency list (reportRSSI-FreqList) of the report configuration is the frequency (the applicable frequency) applicable for the RSSI measurement.

In the case where the report RSSI frequency list has been configured, when any measurement report is triggered, the terminal device 1 may simultaneously report RSSIs of the frequencies indicated by the report RSSI frequency list. Further, in the case where the report RSSI frequency list has been configured, when the RSSI measurement report is triggered, the terminal device 1 may simultaneously report the RSSIs of the frequencies indicated by the report RSSI frequency list. In this case, the terminal device 1 may report the RSSIs to be reported in a descending order (i.e., an order in which dBm of the RSSIs is strong). The terminal device 1 may limit the RSSIs to be reported among the measured RSSIs to a certain number (e.g., 3 frequencies), and report the RSSIs. The number (maxReportFrequencies) of the RSSIs (frequencies) to be reported may be notified from the base station device 2 as a different parameter of the report configuration through the RRC message.

When the frequency indicated by the report RSSI frequency list is the frequency of the secondary cell, in a case where the associated secondary cell is in the activation state, the terminal device 1 measures the RSRP and the RSRQ of the CRS without applying the discovery signal measurement timing configuration included in the associated measurement object. In a case where the associated secondary cell is in the deactivation state, the terminal device 1 applies the discovery signal measurement timing configuration included in the associated measurement object and measures the RSRP and the RSRQ of the CRS in the discovery signal duration. When the terminal device 1 supports the CRS-based discovery signal measurement and the associated secondary cell is in the deactivation state, the terminal device 1 may apply the discovery signal measurement timing configuration when measuring the RSRP and the RSRQ of the CRS of the secondary cell.

Further, when the frequency indicated by the report RSSI frequency list is the frequency of the secondary cell, the terminal device 1 may always apply the discovery signal measurement timing configuration included in the associated measurement object and measure the RSSI in the discovery signal duration regardless of the state (the activation state and the deactivation state) of the associated secondary cell. Further, when the frequency indicated by the report RSSI frequency list is the non-serving frequency, the terminal device 1 may apply the discovery signal measurement timing configuration included in the associated measurement object and measure the RSSI in the discovery signal duration. When the discovery signal measurement timing configuration is not included in the associated measurement object, the terminal device 1 may not perform the aforementioned procedure.

The terminal device 1 of the present embodiment can appropriately determine (decide and estimate) a frequency for measuring the RSSIs and a measurement time (a measurement duration) of the RSSI measurement at the frequency based on measurement parameters notified (configured) from the base station device 2 by the RRC message and related to the RSSI measurement. Further, the terminal device 1 can measure RSSIs of one or multiple frequencies based on the measurement parameters related to the RSSI measurement, put the measurement result into the measurement report message, and transmit the measurement report message. In this way, even when it is not possible to measure the RSRP or the RSRQ due to a busy state, the terminal device 1 can efficiently measure the RSSIs of one or multiple frequencies based on the measurement objects or RSSI measurement parameters indicated by the report configuration.

The base station device 2 of the present embodiment can notify the terminal device 1 of the measurement parameters related to the RSSI measurement through the RRC message in order to allow the terminal device 1 to uniquely determine (decide and estimate) the frequency for measuring the RSSIs and the measurement time (the measurement duration) of the RSSI measurement at the frequency (can configure the measurement parameters for the terminal device 1). Further, the base station device 2 can receive the measurement report message including the applicable RSSI measurement result from the terminal device 1. Further, even when it is not possible to measure the RSRP or the RSRQ due to the busy state, the base station device 2 can transmit the measurement object or the RSSI measurement parameters indicated by the report configuration to the terminal device 1 so as to allow the terminal device 1 to determine a frequency at which the RSSI report is necessary and perform the RSSI measurement at the frequency, so that it is possible to provide an efficient measurement method to the terminal device 1.

Second Embodiment

Next, a second embodiment the present invention will be described below.

The first embodiment has described an example in which the report RSSI frequency list (reportRSSI-FreqList) is put into the report configuration in order to put multiple RSSI reports into the measurement report. However, in the EUTRA, when considering a configuration method in which one measurement object corresponds to one frequency, it is preferable to extend the method such that multiple frequencies (i.e., measurement objects) are handled with one measurement identifier (measId). The following is an example of the extension method. Since a terminal device 1 and a base station device 2 used in the present embodiment have the same configurations as those of FIG. 1 and FIG. 2, a description thereof will be omitted.

Figure 7:
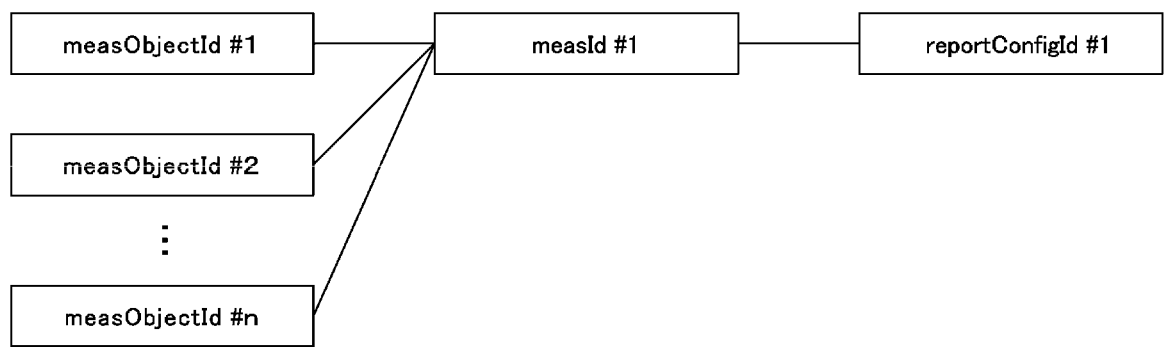
FIG. 7 is a diagram illustrating a correspondence relation of measurement objects according to an embodiment of the present invention.

FIG. 7 illustrates that one report configuration identifier (reportConfigId #1) and multiple measurement object identifiers (measObjectId #1 to # n) are linked to each other by one measurement identifier (measId #1). The correspondence relation (link) between the report configuration and the measurement object is dedicatedly notified (configured) by the base station device 2.

In the case where the correlation of the identifiers illustrated in FIG. 7 is established, when a measurement object identifier (e.g., measObjectId #1) is removed, in a case where there is a measurement object identifier (e.g., measObjectId #2) linked to an associated measurement identifier (e.g., measId #1), the terminal device 1 may not remove the associated measurement identifier (e.g., measId #1).

In this case, when each associated measurement object is the measurement object EUTRA and parameters related to the RSSI measurement are included in an associated report configuration with respect to the respective measurement identifiers (meastId), the terminal device 1 may determine that frequencies of one or multiple measurement objects associated with the associated report configuration are a frequency (an applicable frequency (an applicable set of frequencies)) applicable for the RSSI measurement.

For example, when the report RSSI measurement (reportRSSI-Meas) is configured for the associated report configuration with respect to the respective measurement identifiers (meastId), the terminal device 1 may determine that the frequencies of one or multiple associated measurement objects are the frequency (the applicable frequency (the applicable set of frequencies)) applicable for the RSSI measurement. Further, for example, when the measurement event related to the RSSI is configured for the associated report configuration with respect to the respective measurement identifiers (meastId), the terminal device 1 may determine that the frequencies of one or multiple associated measurement objects are the frequency (the applicable frequency (the applicable set of frequencies)) applicable for the RSSI measurement.

Figure 8:
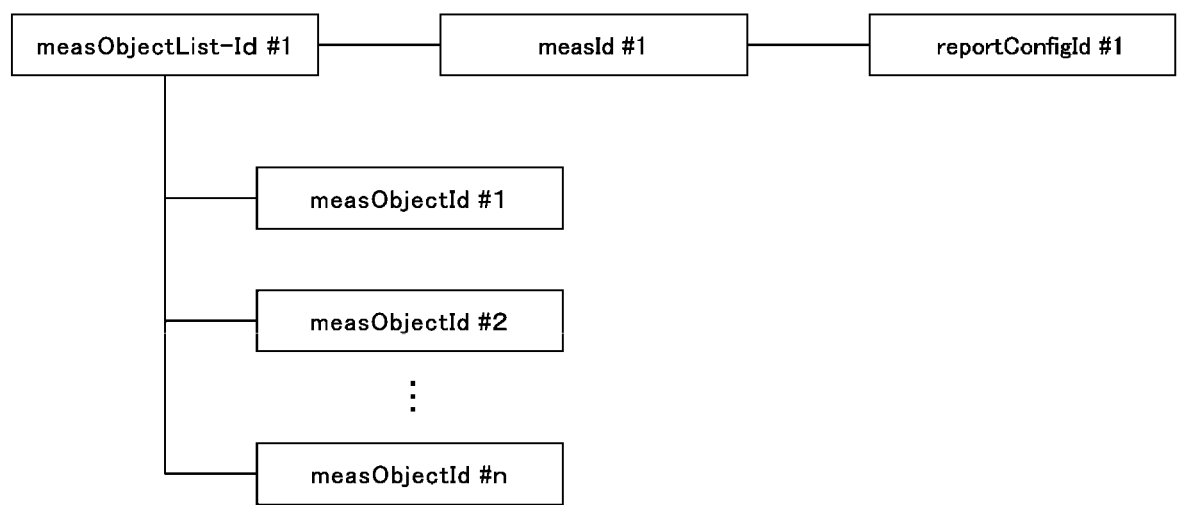
FIG. 8 is a diagram illustrating a correspondence relation of measurement objects and a measurement object list according to an embodiment of the present invention.

FIG. 8 illustrates an example of a measurement configuration when measurement object list identifiers (measObjecList-Id) are added as new parameters. The measurement object list identifiers (measObjecList-Id) can include one or multiple measurement object identifiers (measObjecId #1 to # n in the example of FIG. 8). FIG. 8 illustrates that one report configuration identifier (reportConfigId #1) and one measurement object list identifier (measObjecList-Id #1) are linked to each other by one measurement identifier (measId #1). The correspondence relation (link) between the report configuration and the measurement object list is dedicatedly notified (configured) by the base station device 2.

In this case, when a measurement object included in the associated measurement object list is the measurement object EUTRA and the measurement parameters related to the RSSI measurement are included in the associated report configuration with respect to the respective measurement identifiers (meastId), the terminal device 1 may determine that the frequencies of one or multiple measurement objects associated with the associated report configuration are the frequency (the applicable frequency (the applicable set of frequencies)) applicable for the RSSI measurement.

For example, when the report RSSI measurement (reportRSSI-Meas) is configured for the associated report configuration with respect to the respective measurement identifiers (meastId), the terminal device 1 may determine that the frequencies of one or multiple measurement objects included in the associated measurement object list are the frequency (the applicable frequency (the applicable set of frequencies)) applicable for the RSSI measurement. Further, for example, when the measurement event related to the RSSI is configured for the associated report configuration with respect to the respective measurement identifiers (meastId), the terminal device 1 may determine that the frequencies of one or multiple measurement objects included in the associated measurement object list are the frequency (the applicable frequency (the applicable set of frequencies)) applicable for the RSSI measurement.

Figure 9:
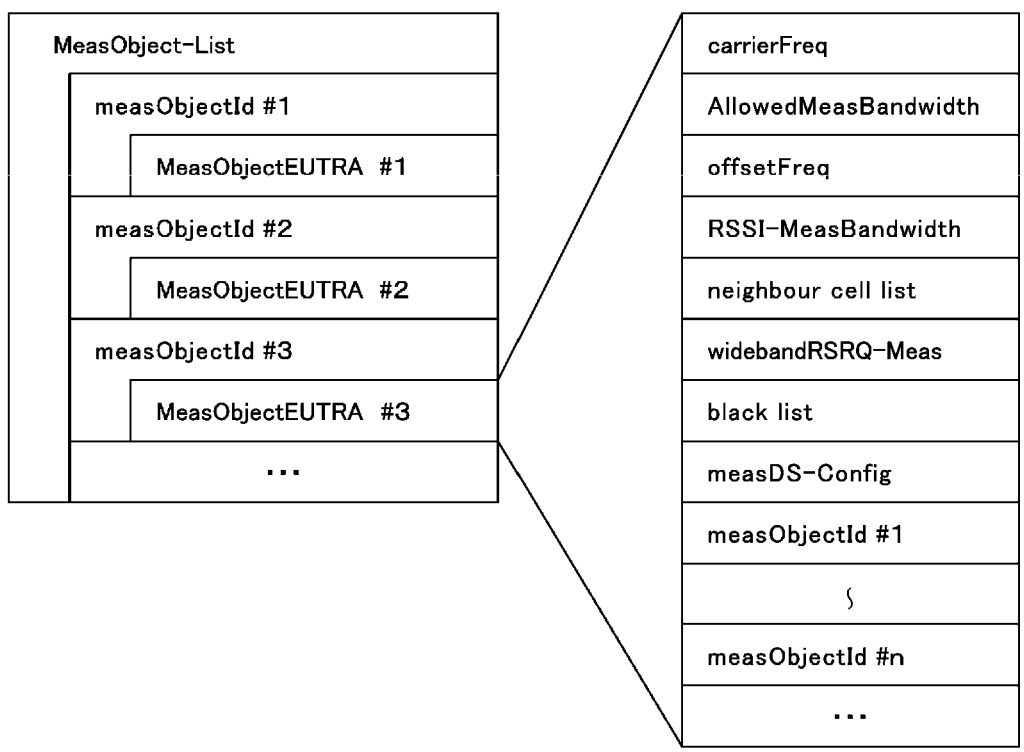
FIG. 9 is a diagram illustrating an example of parameters for measurement objects according to an embodiment of the present invention.

FIG. 9 illustrates an example of measurement objects extended to include measurement object identifiers (measObjectId) indicating other measurement objects. The measurement objects can include one or multiple measurement object identifiers (measObjecId #1 to # n in the example of FIG. 9). One report configuration and one measurement object are linked to each other by one measurement identifier (measId #1). The correspondence relation (link) between the report configuration and the measurement object EUTRA is dedicatedly notified (configured) by the base station device 2.

In this case, when a measurement object identifier included in the associated measurement object is the measurement object EUTRA and the measurement parameters related to the RSSI measurement are included in the associated report configuration with respect to the respective measurement identifiers (meastId), the terminal device 1 may determine that the frequency of the associated measurement object and the frequencies of measurement objects associated with one or multiple measurement object identifiers included in measurement objects associated with the associated report configuration are the frequency (the applicable frequency (the applicable set of frequencies)) applicable for the RSSI measurement.

For example, when the report RSSI measurement (reportRSSI-Meas) is configured for the associated report configuration with respect to the respective measurement identifiers (meastId), the terminal device 1 may determine that the frequency of the associated measurement object and the frequencies of the measurement objects associated with one or multiple measurement object identifiers included in the associated measurement objects are the frequency (the applicable frequency (the applicable set of frequencies)) applicable for the RSSI measurement. Further, for example, when the measurement event related to the RSSI is configured for the associated report configuration with respect to the respective measurement identifiers meastId), the terminal device 1 may determine that the frequency of the associated measurement object and the frequencies of the measurement objects associated with one or multiple measurement object identifiers included in the associated measurement objects are the frequency (the applicable frequency (the applicable set of frequencies)) applicable for the RSSI measurement.

Figure 10:
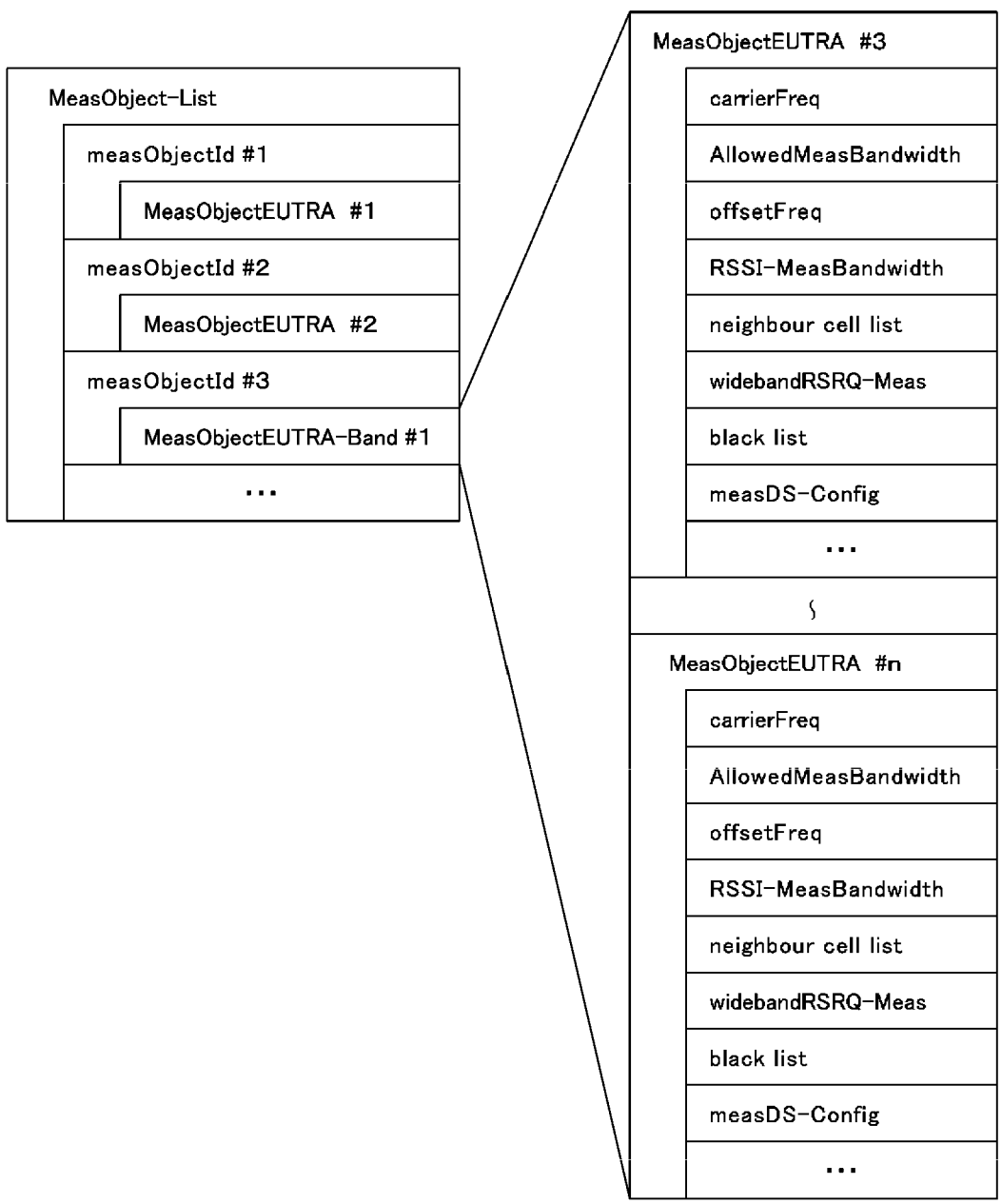
FIG. 10 is a diagram illustrating an example of parameters for measurement objects according to an embodiment of the present invention.

FIG. 10 illustrates an example of measurement objects when a measurement object EUTRA band (measObjectEUTRA-Band) serving as a measurement object and representing an EUTRA band (a frequency band) is added as a new parameter. The measurement object EUTRA band (measObjectEUTRA-Band) can include one or multiple measurement object EUTRAs (measObjectEUTRA #3 to # n in the example of FIG. 10). One report configuration and one measurement object EUTRA band are linked to each other by one measurement identifier (measId #1). The correspondence relation (link) between the report configuration and the measurement object EUTRA band is dedicatedly notified (configured) by the base station device 2.

In this case, when a measurement object included in the associated measurement object EUTRA band is the measurement object EUTRA and the measurement parameters related to the RSSI measurement are included in the associated report configuration with respect to the respective measurement identifiers (meastId), the terminal device 1 may determine that the frequencies of one or multiple measurement objects included in the measurement object EUTRA band associated with the associated report configuration are the frequency (the applicable frequency (the applicable set of frequencies)) applicable for the RSSI measurement.

For example, when the report RSSI measurement (reportRSSI-Meas) is configured for the associated report configuration with respect to the respective measurement identifiers (meastId), the terminal device 1 may determine that the frequencies of one or multiple measurement objects included in the associated measurement object EUTRA band are the frequency (the applicable frequency (the applicable set of frequencies)) applicable for the RSSI measurement. Further, for example, when the measurement event related to the RSSI is configured for the associated report configuration with respect to the respective measurement identifiers (meastId), the terminal device 1 may determine that the frequencies of one or multiple measurement objects included in the measurement object EUTRA band are the frequency (the applicable frequency (the applicable set of frequencies)) applicable for the RSSI measurement.

The terminal device 1 of the present embodiment can appropriately determine (decide and estimate) one or multiple frequencies applicable for the RSSI measurement based on measurement parameters notified (configured) from the base station device 2 by the RRC message and related to the RSSI measurement. Further, the terminal device 1 can measure RSSIs of one or multiple frequencies with respect to one measurement identifier, put the measurement result into the measurement report message, and transmit the measurement report message. In this way, even when it is not possible to measure the RSRP or the RSRQ due to a busy state, the terminal device 1 can efficiently measure the RSSIs of one or multiple frequencies based on the measurement object the or the RSSI measurement parameters indicated by the report configuration.

The base station device 2 of the present embodiment can notify the terminal device 1 of the measurement parameters related to the RSSI measurement through the RRC message in order to allow the terminal device 1 to uniquely determine (decide and estimate) one or multiple frequencies applicable for the RSSI measurement (can configure the measurement parameters for the terminal device 1). Further, the base station device 2 can receive the measurement report message including a measurement result of the RSSIs of one or multiple frequencies measured for one measurement identifier. Further, even when it is not possible to measure the RSRP or the RSRQ due to the busy state, the base station device 2 can transmit the measurement object or the RSSI measurement parameters indicated by the report configuration to the terminal device 1 so as to allow the terminal device 1 to determine one or multiple frequencies at which an RSSI report is necessary and perform the RSSI measurement at the frequencies, so that it is possible to provide an efficient measurement method to the terminal device 1.

Note that the embodiments described above are illustrative examples and can be implemented using various modification examples and replacement examples. For example, a transmission scheme to be used can also be applied to a communication system that uses a Frequency Division Duplex (FDD) scheme, a Time Division Duplex (TDD) scheme, or the two transmission schemes for each frequency. Further, since names related to each parameter and various operations described in the embodiments are called for the sake of the description, even though actual applied names are different from the names of the embodiments of the present invention, it does not have an influence on the gist of the invention claimed in the embodiments of the present invention.

Further, the "connection" used in each embodiment is not limited only to a constitution in which a device and another device are directly connected to each other by using a physical line, and includes a constitution in which they are logically connected to each other and a constitution in which they are wirelessly connected to each other via the same or different radio technologies.

The content described using the specific numerical value is merely an example of a numerical value used for the sake of the description, and any suitable value may be used.

Further, the entity used in each embodiment may be assumed to have the same meaning as that of a sublayer. That is, the RRC entity, the PDCP entity, the RLC entity, and the MAC entity can be respectively replaced with an RRC sublayer, a PDCP sublayer, an RLC sublayer, and a MAC sublayer for a description.

Further, the terminal device 1 includes a stationary or a non-movable electronic device installed inside and outside, for example, an AV equipment, a kitchen device, a cleaning/washing device, an air conditioner, an office equipment, an automatic dispenser, a home appliance, a measuring equipment, an in-vehicle device, a wearable device and a health care equipment (which can be worn on a body), which have a communication function, as well as a portable or movable mobile station device. Further, the terminal device 1 may be used for human-to-human communication, human-to-machine communication, vehicle-to-human communication, vehicle-to-vehicle communication, and structure of road surface-to-vehicle (road-to-vehicle) communication as well as machine-to-machine communication (Machine Type Communication).

Further, the terminal device 1 is also called a user terminal, a mobile station device, a communication terminal, a mobile equipment, a terminal, User Equipment (UE), and a Mobile Station (MS). The base station device 2 is also called a radio base station device, a base station, a radio base station, a fixed station, a nodeB (NB), an evolved nodeB (eNB), a Base Transceiver Station (BTS), and a Base Station (BS).

The base station device 2 is called the NB in UMTS defined by 3GPP and is called the eNB in EUTRA and. Advanced EUTRA. The terminal device 1 in both the UMTS defined by the 3GPP and the EUTRA/the Advanced. EUTRA is called the UE.

For the sake of the description, a method, a means, and steps of an algorithm for implementing functions of each part of the terminal device 1 and the base station device 2 or a part of these functions have been described in detail through a combination by using functional block diagrams; however, these can be directly embodied by hardware, a software module executed by a processor, or a combination thereof.

When implemented by the hardware, the terminal device 1 and the base station device 2 may be constituted by a power feeding device or a battery for supplying power to the terminal device 1 and the base station device 2, a display device such as a liquid crystal and a display driving device, a memory, an input/output interface and an input/output terminal, a speaker, and a combination of other peripheral devices, in addition to the configurations of the aforementioned block diagrams.

When implemented by the software, the functions can be held or transmitted as one or more commands or codes on a computer readable medium. The computer readable medium includes both communication media and computer recording media including media that helps movement of a computer program from a place to another place.

The one or more commands or codes may be recorded on a computer readable recording medium, and the one or more commands or codes recorded on the recording medium may be allowed to be read and executed in a computer system, so that the terminal device 1 and the base station device 2 may be controlled. The "computer system" here includes hardware such as an OS and a peripheral device.

The operations described in each embodiment of the present invention may be implemented by programs. The programs related to each embodiment of the present invention and running on the terminal device 1 and the base station device 2 are programs (programs for functioning a computer) for controlling a CPU and the like in order to perform the functions of the aforementioned embodiments related to each embodiment of the present invention. The information handled by these devices is temporarily held in a RAM at the time of processing, is stored in various ROMs and HDDs, is read out by the CPU as necessary, and then is corrected and written.

In addition to perform the functions of the aforementioned embodiments by executing the programs, the functions are processed together with an operating system, other application programs, and the like based on instructions of the programs, so that the functions of each embodiment of the present invention may be performed.

The "computer readable recording medium" includes a portable medium such as a semiconductor medium (e.g., a RAM, a nonvolatile memory card and the like), an optical recording medium (e.g., a DVD, a MO, a MD, a CD, a BD and the like), and a magnetic recording medium (e.g., a magnetic tape, a flexible disk and the like), and a storage device such as a disk unit embedded in the computer system. Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client.

Further, the aforementioned program may be a program for realizing some of the functions described above, and additionally may be a program for realizing the functions described above in combination with a program already recorded on the computer system.

Further, a part or the whole of each functional block or all characteristics of the terminal device 1 and the base station device 2 used in the aforementioned each embodiment may be realized (performed) by a multi-purpose processor designed to be able to exhibit at least the functions described in the present specification, a Digital Signal Processor (DSP), an Application Specific Integrated Circuit (AMC), or any Integrated Circuit (IC) for general use, a Field Programmable Gate Array signal (FPGA), other programmable logic devices, a discrete gate or a transistor logic, a discrete hardware product, or a combination thereof.

Further, a part or the whole of each functional block or all characteristics of the terminal device 1 and the base station device 2 used in the aforementioned each embodiment may be realized (performed) as an electrical circuit designed to be able to exhibit at least the functions described in the present specification, typically a LSI (an integrated circuit) or a chip set. A chip set may be an element including other parts such as an antenna and a passive component. The functional blocks of the terminal device 1 and the base station device 2 may be individually realized as a chip, or some or all of the functional blocks may be integrated into a chip. The circuit integration technique is not limited to LSI, and the integrated circuits for the functional blocks may be realized as dedicated circuits or a multi-purpose processor. Further, when there appears a circuit integration technology for replacing the LSI with the advance of a semiconductor technology, it is also possible to use an integrated circuit based on the technology.

The multi-purpose processor may be a microprocessor, but instead, a processor may be a processor, controller, micro controller, or state machine of the related art. The multi-purpose processor or the aforementioned each circuit may be constituted by a digital circuit or an analog circuit, and may include both of them.

The processor may be implemented by combining computing devices. For example, the processor may be obtained through a combination of a DSP and a microprocessor, multiple microprocessors, one or more microprocessors connected to a DSP core, or other constitutions thereof.

So far, the embodiments of the invention have been described in detail based on specific examples; however, the gist of each embodiment of the present invention and the claims are not limited to the specific examples and also include design modifications within the scope of the invention. That is, description of the present specification is described for the purpose of illustration, and puts no limitation on each embodiment of the present invention.

Further, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

Supplement

As described above, a terminal device in one embodiment of the present invention is a terminal device, and in a case where information about an RSSI report is included in a report configuration associated with a measurement identifier that is configured, a measurement timing configuration included in a measurement object associated with the report configuration is configured on at least one frequency that is indicated by the measurement object, and an RSSI measurement indicated by the measurement timing configuration is performed in a applicable resource for the RSSI measurement.

Further, in the terminal device in one embodiment of the present invention, the applicable resource may be indicated by a plurality of measurement objects associated with the measurement identifier.

Further, a base station device in one embodiment of the present invention is a base station device, and the base station device notifies a report configuration including information about an RSSI report; a measurement object indicating a applicable resource, in which an RSSI measurement is performed, and including a measurement timing configuration corresponding to at least one frequency; and a measurement identifier for linking the report configuration and the measurement object to each other.

Further, in the base station device in one embodiment of the present invention, the applicable resource may be indicated by a plurality of measurement objects associated with the measurement identifier.

Further, a communication method of a terminal device in one embodiment of the present invention is a communication method of a terminal device, and the communication method includes: in a case where information about an RSSI report is included in a report configuration associated with a measurement identifier that is configured, configuring a measurement timing configuration included in a measurement object associated with the report configuration on at least one frequency that is indicated by the measurement object; and performing an RSSI measurement indicated by the measurement timing configuration in a applicable resource for the RSSI measurement.

Further, in the communication method of the terminal device in one embodiment of the present invention, the applicable resource may be indicated by a plurality of measurement objects associated with the measurement identifier.

Further, a communication method of a base station device in one embodiment of the present invention is a communication method of a base station device, and the communication method includes at least notifying a report configuration including information about an RSSI report, a measurement object indicating a applicable resource, in which an RSSI measurement is performed, and including a measurement timing configuration corresponding to at least one frequency, and a measurement identifier for linking the report configuration and the measurement object to each other.

Further, in the communication method of the base station device in one embodiment of the present invention, the applicable resource may be indicated by a plurality of measurement objects associated with the measurement identifier.

Further, an integrated circuit to be implemented in a terminal device in one embodiment of the present invention is an integrated circuit to be implemented in a terminal device, and the integrated circuit causes, in a case where information about an RSSI report is included in a report configuration associated with a measurement identifier that is configured, the integrated circuit being configured to cause at least the terminal device to perform a function of configuring a measurement timing configuration included in a measurement object associated with the report configuration on at least one frequency indicated by the measurement object, and a function of performing an RSSI measurement indicated by the measurement timing configuration in a applicable resource for the RSSI measurement.

Further, in the integrated circuit to be implemented in the terminal device in the embodiment of the present invention, the applicable resource may be indicated by a plurality of measurement objects associated with the measurement identifier.

Further, an integrated circuit to be implemented in a base station device in one embodiment of the present invention is an integrated circuit to be implemented in a base station device, for causing at least a terminal device to perform a function of notifying a report configuration including information about an RSSI report, a measurement object indicating a applicable resource, in which an RSSI measurement is performed, and including a measurement timing configuration corresponding to at least one frequency, and a measurement identifier for linking the report configuration and the measurement object to each other.

Further, in the integrated circuit to be implemented in the base station device in the embodiment of the present invention, the applicable resource may be indicated by a plurality of measurement objects associated with the measurement identifier.

CROSS-REFERENCE OF RELATED APPLICATION

The present application is based on and claims benefits of priority under Japanese Patent Application (No. 205-144726) filed Jul. 22, 2015, and the entire content thereof is included herein by reference.

REFERENCE SIGNS LIST

1 Terminal device
2, 2-1, 2-2 Base station device
101, 201 Receiver
102, 202 Demodulator
103, 203 Decoder
104, 204 Reception data controller
105, 205 Physical layer controller
106, 206 Transmission data controller
107, 207 Coder
106, 206 Modulator
109, 209 Transmitter
110, 210 Radio resource controller
211 Network signal transmission and/or reception unit
R01, R02 Receive antenna unit
T01, T02 Transmit antenna unit

The invention claimed is:

1. A terminal device, configured to:
receive:
a report configuration including information about a Received Signal Strength Indicator (RSSI) report,
a measurement object indicating an applicable resource, in which an RSSI measurement is performed, and including (i) a first measurement timing configuration used only for the RSSI measurement corresponding to at least one frequency and (ii) a second measurement timing configuration used for a Reference Signal Received Power (RSRP)/Reference Signal Received Quality (RSRQ) measurement, and
a measurement identifier for linking the report configuration and the measurement object to each other; and
perform, in the applicable resource indicated by the first measurement timing configuration for the RSSI measurement, the RSSI measurement.

2. The terminal device according to claim 1, wherein the applicable resource is indicated by a plurality of measurement objects associated with the measurement identifier.

3. A base station device configured to:
notify to a terminal device:
a report configuration including information about a Received Signal Strength Indicator (RSSI) report,
a measurement object indicating an applicable resource, in which an RSSI measurement is performed, and including (i) a first measurement timing configuration used only for the RSSI measurement corresponding to at least one frequency and (ii) a second measurement timing configuration used for a Reference Signal Received Power (RSRP)/Reference Signal Received Quality (RSRQ) measurement, and
a measurement identifier for linking the report configuration and the measurement object to each other; and
receive a result of the RSSI measurement performed by the terminal device in the applicable resource indicated by the first measurement timing configuration for the RSSI measurement.

4. The base station device according to claim 3, wherein the applicable resource is indicated by a plurality of measurement objects associated with the measurement identifier.

5. A communication method of a terminal device, the method comprising:
receiving a report configuration including information about a Received Signal Strength Indicator (RSSI) report, a measurement object indicating an applicable resource, in which an RSSI measurement is performed, and including (i) a first measurement timing configuration used only for the RSSI measurement corresponding to at least one frequency and (ii) a second measurement timing configuration used for a Reference Signal Received Power (RSRP)/Reference Signal Received Quality (RSRQ) measurement, and a measurement identifier for linking the report configuration and the measurement object to each other; and performing, in the applicable resource indicated by the first measurement timing configuration for the RSSI measurement, the RSSI measurement.

6. The communication method according to claim 5, wherein the applicable resource is indicated by a plurality of measurement objects associated with the measurement identifier.

7. A communication method of a base station device, the method comprising:

notifying, to a terminal device, a report configuration including information about a Received Signal Strength Indicator (RSSI) report, a measurement object indicating an applicable resource, in which an RSSI measurement is performed, and including (i) a first measurement timing configuration used only for the RSSI measurement corresponding to at least one frequency and (ii) a second measurement timing configuration used for a Reference Signal Received Power (RSRP)/Reference Signal Received Quality (RSRQ) measurement, and a measurement identifier for linking the report configuration and the measurement object to each other; and receiving a result of the RSSI measurement performed by the terminal device in the applicable resource indicated by the first measurement timing configuration for the RSSI measurement.

8. The communication method according to claim 7, wherein the applicable resource is indicated by a plurality of measurement objects associated with the measurement identifier.

9. An integrated circuit to be implemented in a terminal device for causing at least a terminal device to perform:

a function of receiving a report configuration including information about a Received Signal Strength Indicator (RSSI) report, a measurement object indicating an applicable resource, in which an RSSI measurement is performed, and including (i) a first measurement timing configuration used only for the RSSI measurement corresponding to at least one frequency and (ii) a second measurement timing configuration used for a Reference Signal Received Power (RSRP)/Reference Signal Received Quality (RSRQ) measurement, and a measurement identifier for linking the report configuration and the measurement object to each other; and a function of performing, in the applicable resource indicated by the first measurement timing configuration for the RSSI measurement, the RSSI measurement.

10. The integrated circuit according to claim 9, wherein the applicable resource is indicated by a plurality of measurement objects associated with the measurement identifier.

11. An integrated circuit to be implemented in a base station device, for causing at least a terminal device to perform:

a function of notifying, to a terminal device, a report configuration including information about a Received Signal Strength Indicator (RSSI) report, a measurement object indicating an applicable resource, in which an RSSI measurement is performed, and including (i) a first measurement timing configuration used only for the RSSI measurement corresponding to at least one frequency and (ii) second measurement timing configuration used for a Reference Signal Received Power (RSRP)/Reference Signal Received Quality (RSRQ) measurement, and a measurement identifier for linking the report configuration and the measurement object to each other; and a function of receiving a result of the RSSI measurement performed by the terminal device in the applicable resource indicated by the first measurement timing configuration for the RSSI measurement.

12. The integrated circuit according to claim 11, wherein the applicable resource is indicated by a plurality of measurement objects associated with the measurement identifier.

* * * * *